United States Patent
Palanigounder et al.

(10) Patent No.: US 12,126,994 B2
(45) Date of Patent: Oct. 22, 2024

(54) USER PLANE INTEGRITY PROTECTION (UP IP) CAPABILITY SIGNALING IN 5G/4G SYSTEMS

(71) Applicant: QUALCOMM Incorporated, San Diego, CA (US)

(72) Inventors: Anand Palanigounder, San Diego, CA (US); Adrian Edward Escott, Reading (GB); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 17/025,367

(22) Filed: Sep. 18, 2020

(65) Prior Publication Data

US 2021/0105612 A1 Apr. 8, 2021

Related U.S. Application Data

(60) Provisional application No. 62/910,632, filed on Oct. 4, 2019.

(51) Int. Cl.
*H04W 12/08* (2021.01)
*H04W 8/22* (2009.01)
(Continued)

(52) U.S. Cl.
CPC ........... *H04W 12/033* (2021.01); *H04W 8/22* (2013.01); *H04W 12/102* (2021.01);
(Continued)

(58) Field of Classification Search
CPC . H04W 12/033; H04W 76/10; H04W 12/102; H04W 8/22
(Continued)

(56) References Cited

U.S. PATENT DOCUMENTS 10,091,649 B2 * 10/2018 Lee .................. H04W 12/0431
10,362,011 B2 7/2019 Lee et al.
(Continued)

FOREIGN PATENT DOCUMENTS

CN 109041143 A * 12/2018 ............ H04W 12/04
CN 109155949 A 1/2019
(Continued)

OTHER PUBLICATIONS

"3rd Generation Partnership Project; Technical Specification Group Services and System Aspects; Technical report on key issues and potential solutions for Integrity protection of the User Plane; (Release 16)", 3GPP Draft, S3-193693V2, DRAFTTR33853-060CL, 3rd Generation Partnership Project (3GPP), Mobile Competence Centre, Sophia-Antipolis Cedex, France, Oct. 21, 2019, XP051799231, pp. 1-30, Retrieved from the Internet: URL:https://ftp.3gpp.org/tsg_sa/WG3_Security/TSGS3_96AH_Chongqing/Docs/S3-193693.zip S3-193693v2 draftTR33853-060cl.doc.
(Continued)

*Primary Examiner* — Haresh N Patel
(74) *Attorney, Agent, or Firm* — The Marbury Law Group

(57) ABSTRACT

Methods, systems, and devices are provided for supporting user plane integrity protection (UP IP) for communications with a radio access network (RAN). Various embodiments may include indicating whether or not a wireless device supports UP IP over Evolved Universal Mobile Telecommunications System (UMTS) Terrestrial Radio Access (eU-TRA) by including UP IP support indications in user equipment (UE) security capability information elements (IEs).

25 Claims, 19 Drawing Sheets

(51) Int. Cl.
| | | |
|---|---|---|
| *H04W 12/033* | (2021.01) | |
| *H04W 12/06* | (2021.01) | |
| *H04W 12/102* | (2021.01) | |
| *H04W 76/10* | (2018.01) | |
| *H04W 84/04* | (2009.01) | |
| *H04W 88/02* | (2009.01) | |

(52) U.S. Cl.
CPC .......... *H04W 76/10* (2018.02); *H04W 84/042* (2013.01); *H04W 88/02* (2013.01)

(58) Field of Classification Search
USPC ............................................................ 726/1
See application file for complete search history.

(56) References Cited

U.S. PATENT DOCUMENTS

| | | | | |
|---|---|---|---|---|
| 2016/0330612 | A1* | 11/2016 | Mildh | H04W 76/25 |
| 2018/0270668 | A1* | 9/2018 | Nair | H04W 76/10 |
| 2018/0270679 | A1* | 9/2018 | Laselva | H04W 36/0088 |
| 2019/0246282 | A1 | 8/2019 | Li et al. | |
| 2020/0008069 | A1* | 1/2020 | Zhu | H04W 16/14 |
| 2020/0092879 | A1* | 3/2020 | Wu | H04W 8/24 |
| 2020/0205045 | A1 | 6/2020 | Pan et al. | |
| 2021/0076441 | A1* | 3/2021 | Guha | H04W 40/20 |

FOREIGN PATENT DOCUMENTS

| | | | | | |
|---|---|---|---|---|---|
| CN | 110036664 | A | | 7/2019 | |
| EP | 2020533843 | A | * | 4/2021 | ............ H04L 63/20 |
| WO | 2017011114 | A1 | | 1/2017 | |
| WO | 2018054461 | A1 | | 3/2018 | |
| WO | WO-2019158381 | A1 | * | 8/2019 | ............ H04W 12/04 |
| WO | WO-2020038543 | A1 | * | 2/2020 | ............ H04L 63/205 |

OTHER PUBLICATIONS

International Search Report and Written Opinion—PCT/US2020/051816—ISA/EPO—Nov. 26, 2020. 16 pages.

Qualcomm Incorporated: "Proposed Solution for Key Issue #6," 3GPP Draft, 3GPP TSG-SA WG3 Meeting #96-Adhoc, S3-193692, 3rd Generation Partnership Project (3GPP), Mobile Competence Centre, 650, Route Des Lucioles, F-06921, Sophia-Antipolis Cedex, France, vol. SA WG3, No. Chongqing (China). Oct. 14, 2019-Oct. 18, 2019, Oct. 21, 2019 (Oct. 21, 2019), XP051799230, 2 pages, the whole document.

"3rd Generation Partnership Project; Technical Specification Group Core Network and Terminals; Non-Access-Stratum (NAS) Protocol for 5G System (5GS); Stage 3 (Release 16)", 3GPP TS 24.501, 3GPP, Mobile Competence Centre, 650, Route Des Lucioles, F-06921, Sophia-Antipolis Cedex, France, vol. CT WG1, No. V16.2.0, Sep. 24, 2019, pp. 1-611, XP051784713, p. 22, para. 1 p. 34, para. 4-p. 44, para. 4.4.2.6 p. 493, para. 9.11.3.54-p. 497.

"3rd Generation Partnership Project; Technical Specification Group Core Network and Terminals; Non-Access-Stratum (NAS) Protocol for Evolved Packet System (EPS); Stage 3 (Release 16)," Draft 24301-G20-V2, 3GPP, Mobile Competence Centre, 650, Route Des Lucioles, F-06921, Sophia-Antipolis Cedex, France, Sep. 24, 2019, XP051802406, pp. 1-558, p. 21, para. 1 p. 33, para. 4-p. 47, para. 4.4.2.5 p. 443, para. 9.9.3.36-p. 447.

"3rd Generation Partnership Project; Technical Specification Group Services and System Aspects; Technical Report on Key Issues and Potential Solutions for Integrity Protection of the User Plane; (Release 16)", 3GPP Standard, Technical Report, 3GPP TR 33.853, 3GPP, Mobile Competence Centre, 650, Route Des Lucioles, F-06921, Sophia-Antipolis Cedex, France, No. V0.5.0, Sep. 22, 2019, pp. 1-25, XP051784632.

3GPP: "3rd Generation Partnership Project, Technical Specification Group Services and System Aspects, Procedures for the 5G System (5GS) Stage2 (Release 16)", 3GPP TS 23.502 V16.2.0, Sep. 24, 2019, pp. 1-525, pp. 83 to 101.

ERICSSON: "New Solution for a UE Connected to 5GC Indicating Support of UP IP Over eUTRA", 3GPP TSG-SA WG3 Meeting #96, S3-193146, Wroclaw (Poland), Aug. 26-30, 2019, Aug. 30, 2019, 3 Pages.

* cited by examiner

Option 3 (MCG Split Bearer)
Non-Standalone LTE Anchor, EPC Connected

Option 3a (SCG Bearer)
Non-Standalone LTE Anchor, EPC Connected

Option 3x (SCG Split Bearer)
Non-Standalone LTE Anchor, EPC Connected

Option 5
Standalone LTE, NGC Connected

Option 7 (MCG Split Bearer)
Non-Standalone LTE Anchor, NGC Connected

Option 7a (SCG Split Bearer)
Non-Standalone LTE Anchor, NGC Connected

Option 7x (SCG Split Bearer)
Non-Standalone LTE Anchor, NGC Connected

USER PLANE INTEGRITY PROTECTION (UP IP) CAPABILITY SIGNALING IN 5G/4G SYSTEMS

RELATED APPLICATIONS

This application claims the benefit of priority to U.S. Provisional Application No. 62/910,632, entitled "UP IP Capability Signaling In 5G/4G Systems" filed Oct. 4, 2019, the entire contents of which are hereby incorporated herein by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods for supporting user plane integrity protection (UP IP) for communications with a radio access network (RAN). Various aspects may include indicating whether or not a wireless device supports UP IP over Evolved Universal Mobile Telecommunications System (UMTS) Terrestrial Radio Access (eUTRA) by setting one of the Evolved Packet System (EPS) Encryption Algorithm (EEA) or EPS Integrity Algorithm (EIA) bits in the fifth generation (5G) user equipment (UE) security capability information element (IE). In some aspects, the same bit may also be used to indicate that the wireless device supports the same maximum data rate capability for UP IP over eUTRA. Various aspects may include indicating whether or not a wireless device supports UP IP over eUTRA by setting one of the EEA or EIA bits in the fourth generation (4G) S1 UE security capability IE. In some aspects, the same bit may also be used to indicate that the wireless device supports UP IP over New Radio (NR). In some aspects, a different bit in the 4G S1 UE security capability IE may indicate that the wireless device supports UP IP over NR.

Various aspects may include determining whether a wireless device supports UP IP for eUTRA connections established between the wireless device and a RAN, generating a first security capability information element including a first UP IP support indication, wherein the first UP IP support indication indicates whether the wireless device supports UP IP for eUTRA connections established between the wireless device and the RAN, and sending the first security capability information element to a base station. In some aspects, the first UP IP support indication may be a bit setting in the first security capability information element. In some aspects, the first security capability information element may be a S1 UE security capability. In various aspects, a UP IP support indication may indicate support of UP IP with one or more algorithms.

Various aspects may further include generating a second security capability information element including a second UP IP support UE equipment computing device supports UP IP for eUTRA connections established between the wireless device and the RAN or UP IP for NR connections established between the wireless device and the RAN; and sending the second security capability information element to the base station. In some aspects, the second UP IP support indication may be a bit setting in the second security capability information element. In some aspects, the second security capability information element may be a 5G UE security capability.

Various aspects may further include determining whether the wireless device supports UP IP for NR connections established between the wireless device and a RAN, wherein generating the first security capability information element including the first UP IP support indication may include generating the first security capability information element including the first UP IP support indication and a third UP IP support indication, wherein the third UP IP support indication indicates whether the wireless device supports UP IP for NR connections established between the wireless device and the RAN. In some aspects, the third UP IP support indication may be another bit setting in the first security capability information element.

Various aspects may include receiving a security capability information element at a processor of a network computing device of a wireless device, the security capability information element including a UP IP support indication, and determining whether the security capability information element indicates that the wireless device supports UP IP for eUTRA connections established with the wireless device based at least in part on the UP IP support indication. In some aspects, the UP IP support indication may be a bit setting in the security capability information element. In some aspects, the security capability information element may be a S1 UE security capability or a 5G UE security capability. Various aspects may further include determining whether the security capability information element indicates that the wireless device supports UP IP for NR connections established with the wireless device. In some aspects, the UP IP support indication may indicate whether the UP IP is supported for NR connections. In some aspects, the security capability information element may include another UP IP support indication that indicates whether the UP IP is supported for NR connections. In some aspects, the other UP IP support indication may be another bit setting in the security capability information element. In various aspects, a UP IP support indication may indicate support of UP IP with one or more algorithms.

In some aspects, the RAN may be a 4G RAN or a 5G RAN. In some aspects, the RAN may be connected to an Evolved Packet Core (EPC) network or a Next Generation Core (NGC) network. In some aspects, the base station may be an enode B (eNB) or a next generation-eNB (ng-eNB). In some aspects, the UP IP support indication may be delivered to one type of core network and may be used when the wireless device moves to another type of core network.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above.

Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above. Further aspects may include a network computing device having a processor configured to perform one or more operations of the methods summarized above. Further aspects may include a non-transitory processor-readable storage medium having stored thereon processor-executable instructions configured to cause a processor of a network computing device to perform operations of the methods summarized above. Further aspects include a network computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
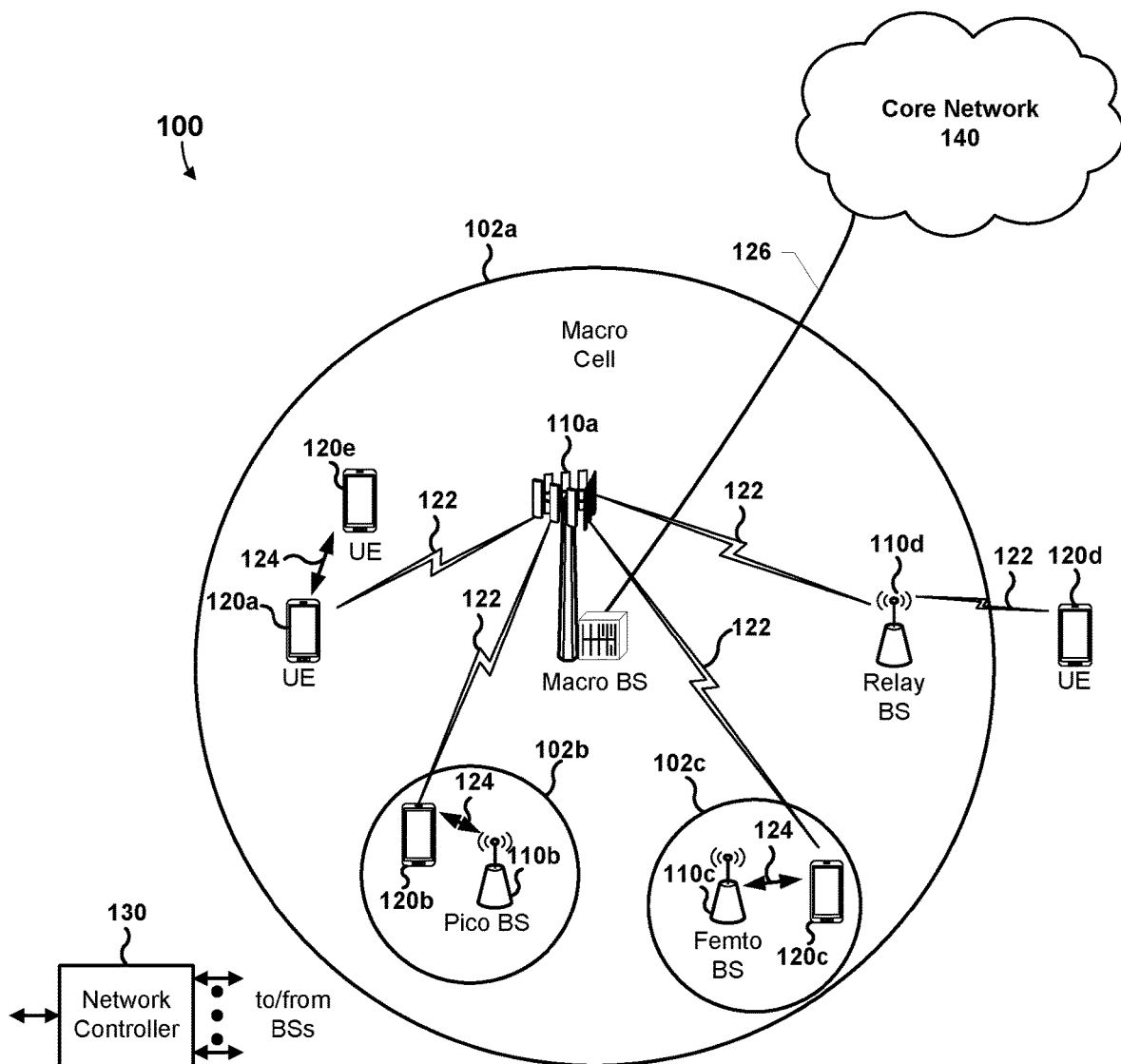
FIG. 1A is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects include methods for supporting user plane integrity protection (UP IP) for communications with a radio access network (RAN). Support for UP IP may enable wireless devices and/or network computing devices to detect that user plane data has been modified in transit. Detection of modifications to user plane data may improve network and/or wireless device security.

The terms "wireless device" or "computing device" are used interchangeably herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wristbands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU Core, Internet protocol (IP) Core, graphics processor unit (GPU) Core, etc.) configured to read and execute program instructions. A SOC may include multiple multicore processors, and each processor in an SOC may be referred to as a Core. The term "multiprocessor" may be used herein to refer to a System or device that includes two or more processing units configured to read and execute program instructions.

Various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

User plane integrity protection allows a network operator's computing devices and a wireless device (e.g., user equipment (UE) computing device) to detect that user plane data has been modified in transit between each other. Integrity protection on the user plane over at least the radio interface is currently available for a fifth generation (5G) access network with a 5G core but not for a Long Term Evolution (LTE) access network with an Evolved Packet Core (EPCs) or LTE with a 5G core. Integrity protection is currently specified for the control plane to protect signaling messages, but is only currently specified partially for the 5G user plane. There are various options for how 5G and fourth generation (4G) technologies can be implemented together, for example, Option 1—Evolved Universal Mobile Telecommunications System (UMTS) Terrestrial Radio Access (eUTRA) with EPC, Option 2—new radio (NR) standalone with a 5G Core, Option 3—EPC based Dual Connectivity of eUTRA and NR radio access technology (RAT), Option 4-5G core based Dual Connectivity (NR master—eUTRA secondary), Option 5-5G core with eUTRA, and Option 7-5G core based Dual Connectivity (eUTRA master—NR secondary). Thus, supporting user plane integrity protection (UP IP) in different various options for 5G and 4G implementations may be beneficial.

5G wireless device support of UP IP over NR is signalled to the 5GC network using a user equipment (UE) security capability information element (IE) during wireless device registration to a 5G system. Section 9.11.3.54 of 3rd Generation Partnership Project (3GPP) Technical Specification (TS) (3GPP TS) 24.501 describes the UE security capability IE for 5G systems. The UE security capability IE indicates the supported NR integrity protection algorithms for NR and the integrity protection algorithms for eUTRA. Fourth generation (4G) UE security capability, such as Evolved Packet System (EPS) UE security capability, is indicated to the network using a separate IE in 5G systems, referred to as the S1 UE security capability IE in 5G systems, and similar IEs are used when the wireless device registers to EPS and are defined in sections 9.9.3.34 and 9.9.3.53 of 3GPP TS 24.301. As discussed herein, the IEs used when registering to EPS are referred to as the 4G S1 UE security capability IE.

Various embodiments may enable a separate indication of UP IP support over eUTRA to a network. In various embodiments, the separate indication of UP IP support over eUTRA may be in addition to signaling of 5G wireless device support of UP IP over NR in 5G systems. In various embodiments, the separate indication of UP IP support over eUTRA may be indicated when the wireless device starts supporting UP IP over eUTRA. Various embodiments may enable a wireless device to indicate support for UP IP over eUTRA when the wireless device is connecting to a 5G Core (5GC) via a base station in a 5G radio access network (RAN), such as a next generation-eNB (ng-eNB). Various embodiments may enable a wireless device to indicate support for UP IP over eUTRA when the wireless device is connecting to a 4G core network, such as an EPC, via a base station of a 4G RAN, such as an enode B (eNB). Various embodiments may enable a wireless device to indicate support for UP IP over eUTRA, as well as NR, when the wireless device is connecting to a 4G core network, such as an EPC, via a base station of a 4G RAN, such as an eNB. In some embodiments, a UP IP support indication may be delivered to one type of core network (e.g., an EPC or a 5GC), but may be used when the wireless device moves to another type of core network (e.g., an EPC or a 5GC).

Various embodiments include methods for supporting user plane integrity protection (UP IP) for communications with a radio access network (RAN). Various embodiments may include indicating whether or not a wireless device supports UP IP over eUTRA by setting one of the unused or spare Evolved Packet System (EPS) Encryption Algorithm (EEA) or EPS Integrity Algorithm (EIA) bits in the 5G UE security capability IE. In some embodiments, the same bit may also be used to indicate that the wireless device supports the same maximum data rate capability for UP IP over eUTRA. Various embodiments may include indicating whether or not a wireless device supports UP IP over eUTRA by setting one of the unused or spare EEA or EIA bits in the 4G S1 UE security capability IE. In some embodiments, the same bit may also be used to indicate that the wireless device supports UP IP over New Radio (NR). In some embodiments, a different bit in the 4G S1 UE security capability IE may indicate that the wireless device supports UP IP over NR. Indicating whether or not a wireless device supports UP IP over eUTRA by setting one of the unused or spare bits in the 5G UE security capability IE and/or 4G S1 UE security capability IE may enable the wireless device to interact with legacy 4G RAN nodes, such as legacy eNBs, that do not support UP IP. For example, legacy 4G RAN nodes may ignore the unused or spare bits in the 5G UE security capability IE and/or 4G S1 UE security capability IE. In this manner, various embodiments may enable a wireless device to transition between legacy 4G RAN nodes and 4G RAN and 5G RAN nodes that do support UP IP without determining the state of UP IP support of any specific RAN node to which the wireless device may connect.

FIG. 1A is a system block diagram illustrating an example communication system 100 suitable for implementing any of the various embodiments. The communications system 100 may be a Fifth Generation (5G) New Radio (NR) network, or any other suitable network such as an LTE network, 5G network, etc. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (also referred to as user equipment (UE) computing devices) (illustrated as wireless device 120*a*-120*e* in FIG. 1A). The communications system 100 may also include a number of base stations (illustrated as the BS 110*a*, the BS 110*b*, the BS 110*c*, and the BS 110*d*) and other network entities. A base station is an entity that communicates with wireless devices (mobile devices or UEs), and also may be referred to as an NodeB, a Node B, an LTE evolved nodeB (eNB), an Access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110*a*-110*d* may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110*a* may be a macro BS for a macro cell 102*a*, a base station 110*b* may be a pico BS for a pico cell 102*b*, and a base station 110*c* may be a femto BS for a femto cell 102*c*. A base station 110*a*-110*d* may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110*a*-110*d* may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110*a*-110*d* may communicate with the core network 140 over a wired or wireless communication link 126. The wireless device 120*a*-120*e* (UE computing device) may communicate with the base station 110*a*-110*d* over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/ Internet Protocol (TCP/IP).

The communications system 100 also may include relay stations (e.g., relay BS 110*d*). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1A, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120*a*, 120*b*, 120*c* may be dispersed throughout communications system 100, and each wireless device may be stationary or mobile. A wireless device also may be referred to as an access terminal, a UE, a terminal, a mobile station, a subscriber unit, a station, etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In some implementations, two or more mobile devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

In general, any number of communications systems and any number of wireless networks may be deployed in a given geographic area. Each communications system and wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

For example, 5G and 4G technologies may be deployed together. As specific examples, FIGS. 1B-1E illustrate various deployment options for 4G and 5G RAN connections to a 4G core network and FIGS. 1F-1I illustrate various deployment options for 4G and 5G RAN connections to a 5G core network.

Figure 1B:
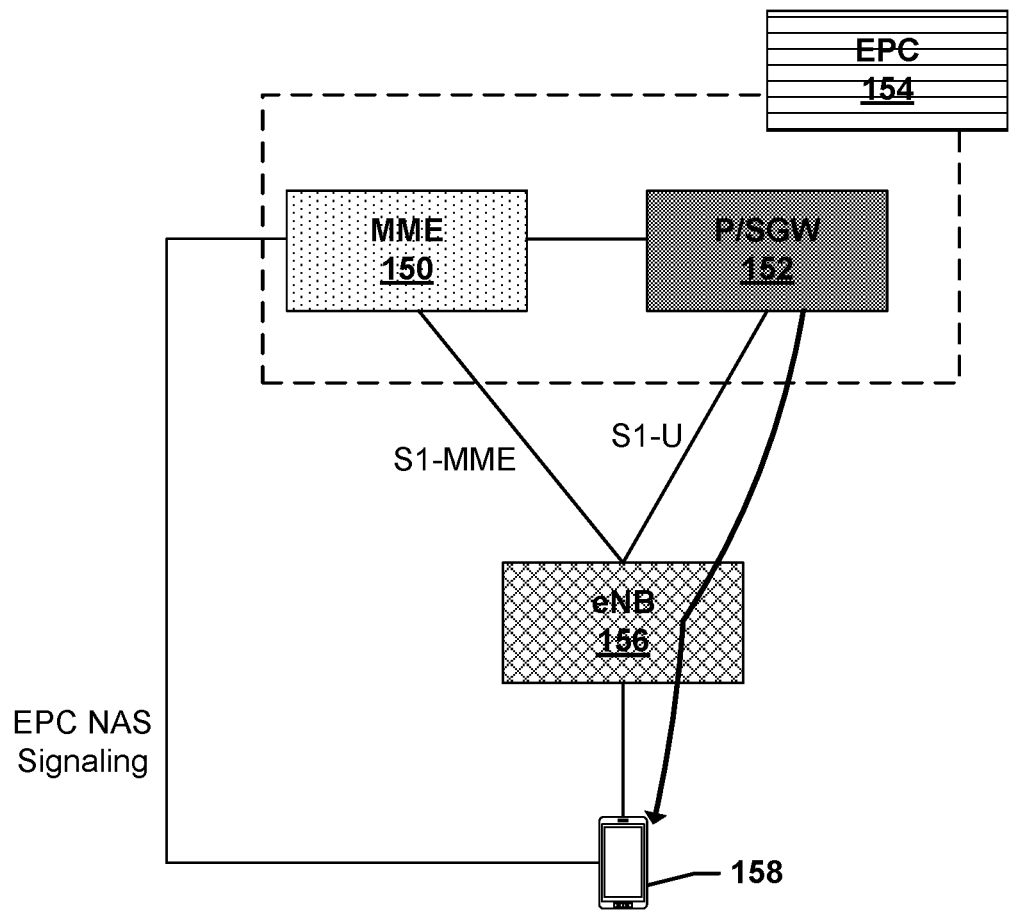
FIGS. 1B-1E illustrates various deployment options for 4G and 5G radio access network connections to a 4G core network.
Figure 1C:
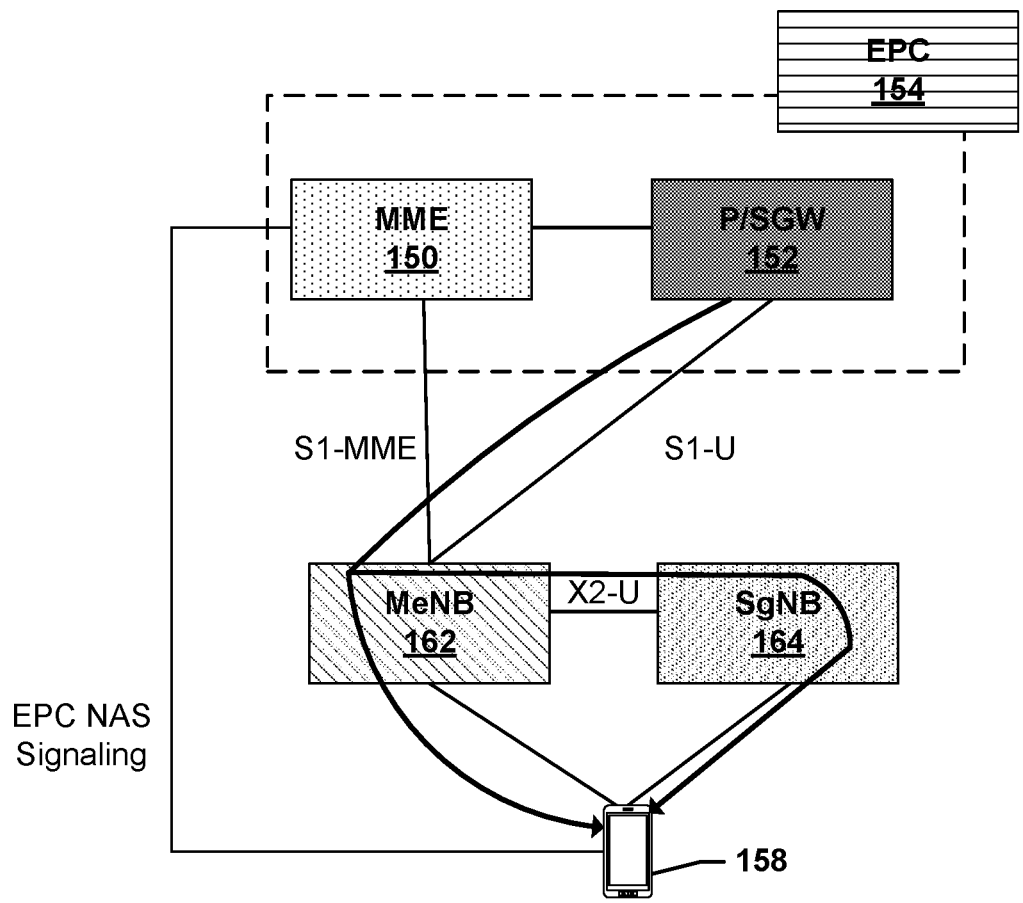
Figure 1D:
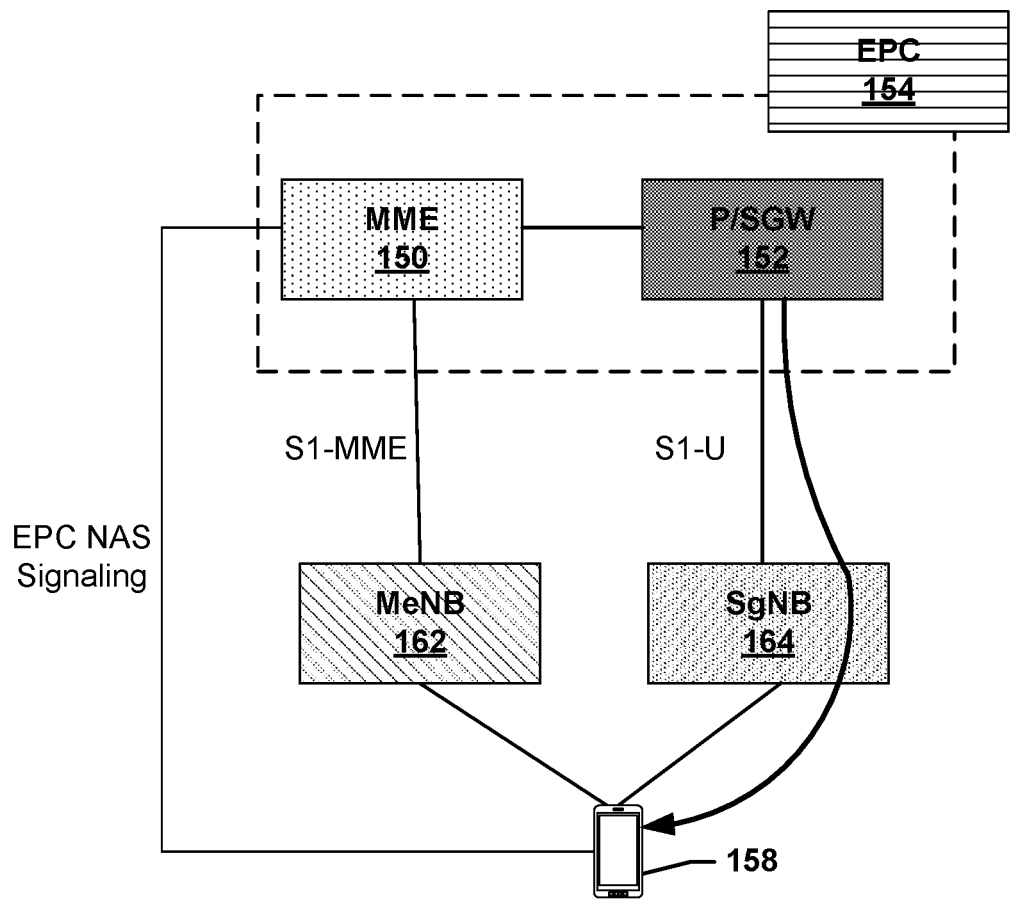
Figure 1E:
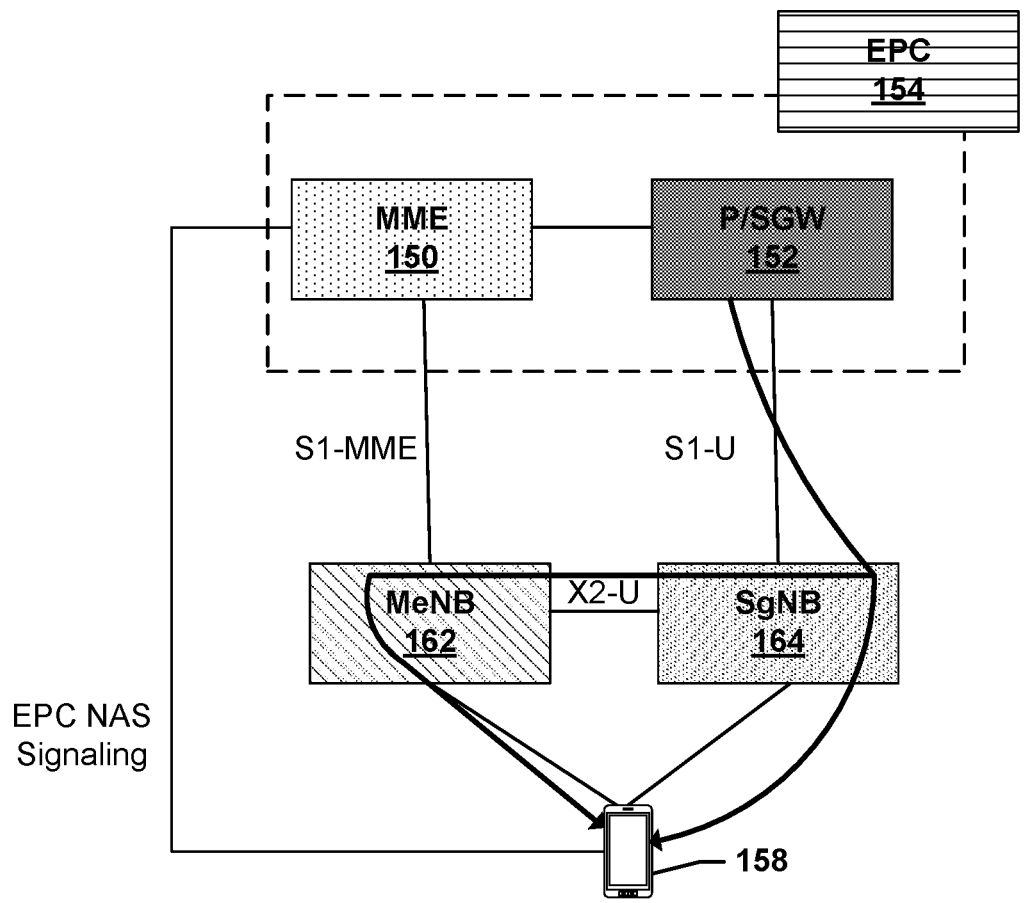

With reference to FIGS. 1A-1I, as shown in FIG. 1B, example LTE/NR EPC connection deployment options may include Option 1—a standalone LTE RAN including a base station, such as an eNB 156 (e.g., a base station 110a-d), connected to an EPC 154 (e.g., core network 140). The EPC 154 may include a mobility management entity (MME) server 150 and a packet data network and serving gateway (P/SGW) server 152. A wireless device 158 (e.g., wireless device 120a-120e) may connect to the eNB 156 and send/receive user plane data to the eNB 156 which may send/receive the user plane data to the EPC 154 via the S1-U interface with the P/SGW server 152. As shown in FIG. 1C, example LTE/NR EPC connection deployment options may include Option 3—Master Cell Group (MCG) split bearer with a non-standalone LTE anchor connected to the EPC 154. In such a deployment, a master base station, such as a master eNB (MeNB) 162 (e.g., base station 110a-110d) may control a secondary gNB (SgNB) 164 (e.g., 110a-110d). The MeNB 162 may connect to the SgNB 164 and may provide the connection for the SgNB 164 to the EPC 154. The wireless device 158 may connect to the MeNB 162 or the SgNB 164 and send/receive user plane data to the MeNB 162 or the SgNB 164. The SgNB 164 may send/receive user plane data from the MeNB 162 via the X2-U interface. The MeNB 162 may send/receive user plane data to the EPC 154 via the S1-U interface with the P/SGW server 152. As shown in FIG. 1D, example LTE/NR EPC connection deployment options may include Option 3a—Secondary Cell Group (SCG) bearer with a non-standalone LTE anchor connected to the EPC 154. In such a deployment, the SgNB 164 may connect to the EPC 154. The wireless device 158 may connect to the SgNB 164 and send/receive user plane data to the SgNB 164, which may send/receive the user plane data to the EPC 154 via the S1-U interface with the P/SGW server 152. As shown in FIG. 1E, example LTE/NR EPC connection deployment options may include Option 3x—SCG split bearer with a non-standalone LTE anchor connected to the EPC 154. The SgNB 164 may connect to the MeNB 162 and may provide the connection for the MeNB 162 to the EPC 154. The wireless device 158 may connect to the MeNB 162 or the SgNB 164 and send/receive user plane data to the MeNB 162 or the SgNB 164. The MeNB 162 may send/receive user plane data from the SgNB 164 via the X2-U interface. The SgNB 164 may send/receive user plane data to the EPC 154 via the S1-U interface with the P/SGW server 152.

Figure 1F:
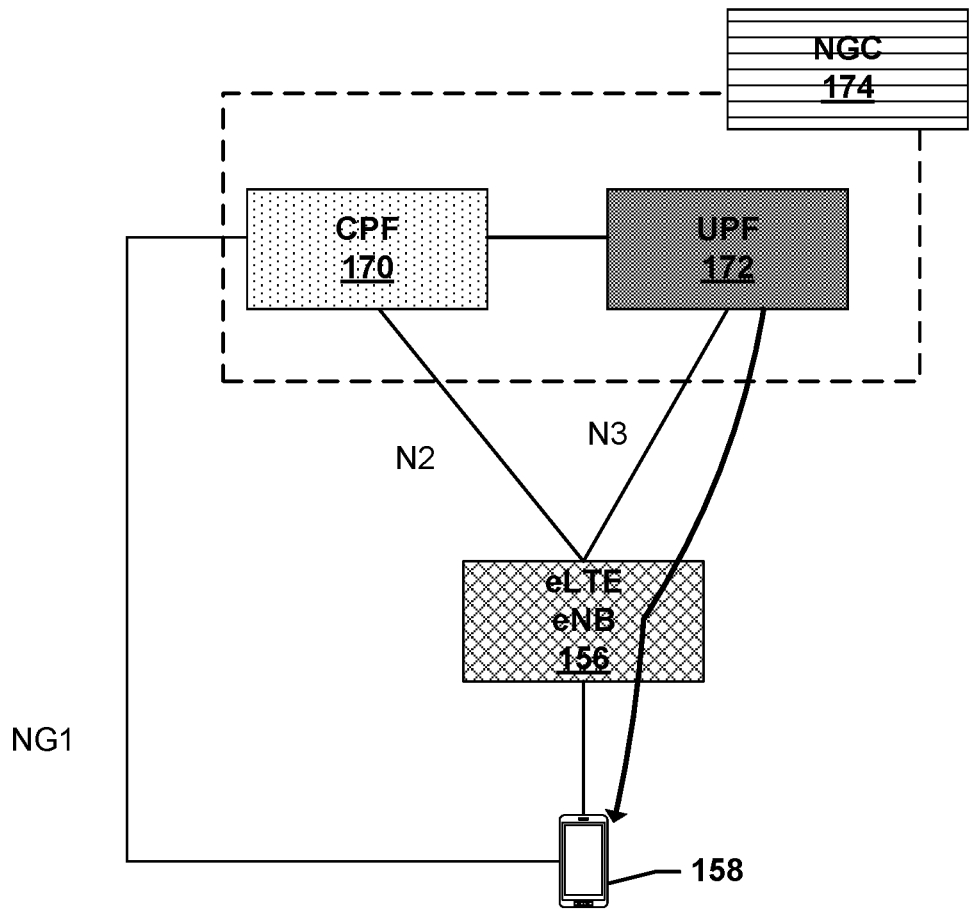
FIG. 1F-1I illustrates various deployment options for 4G and 5G radio access network connections to a 5G core network.
Figure 1G:
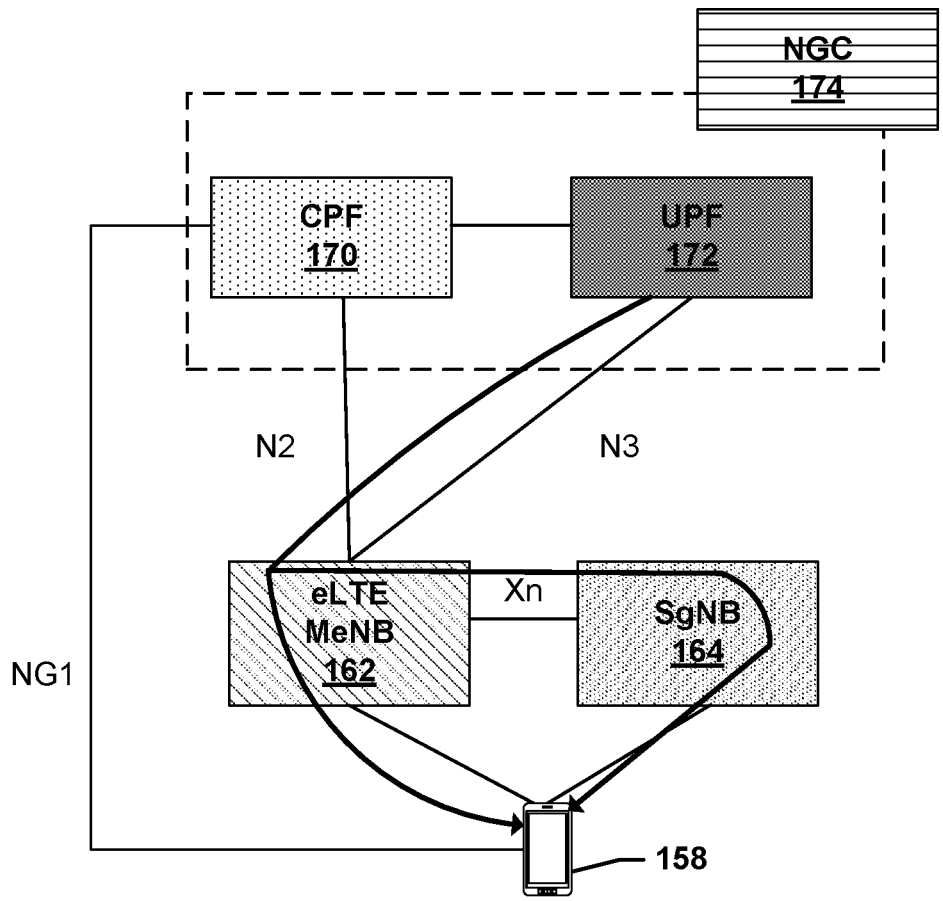
Figure 1H:
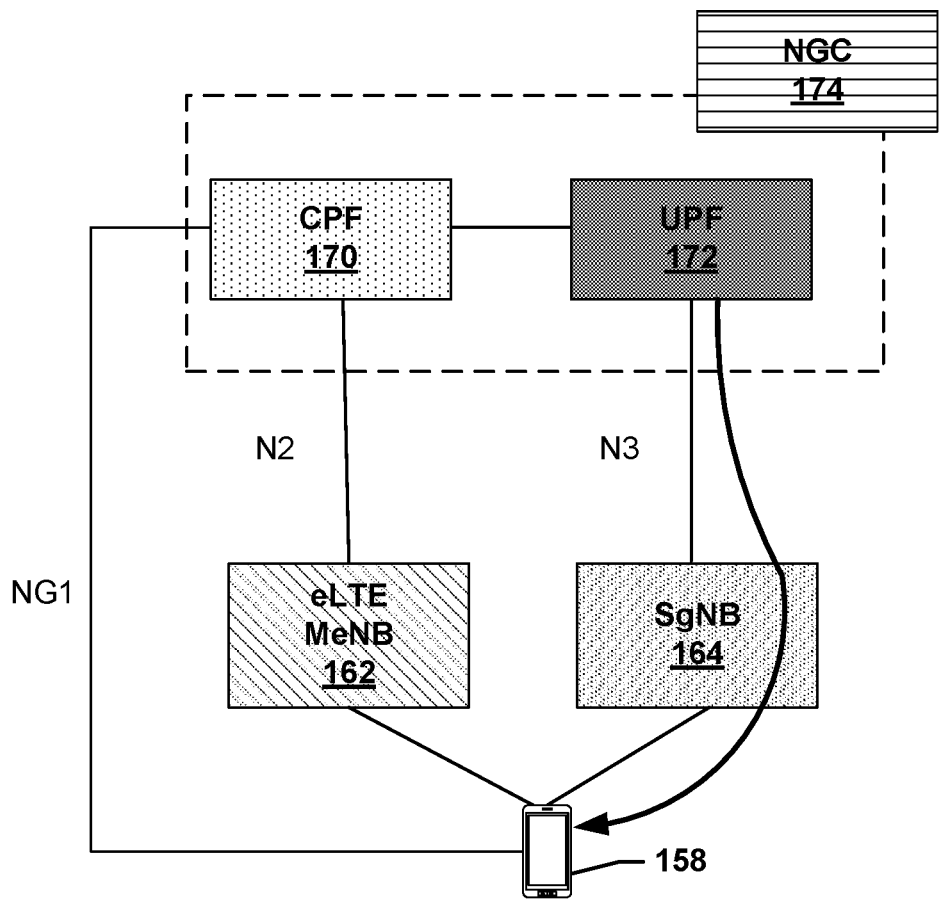
Figure 1I:
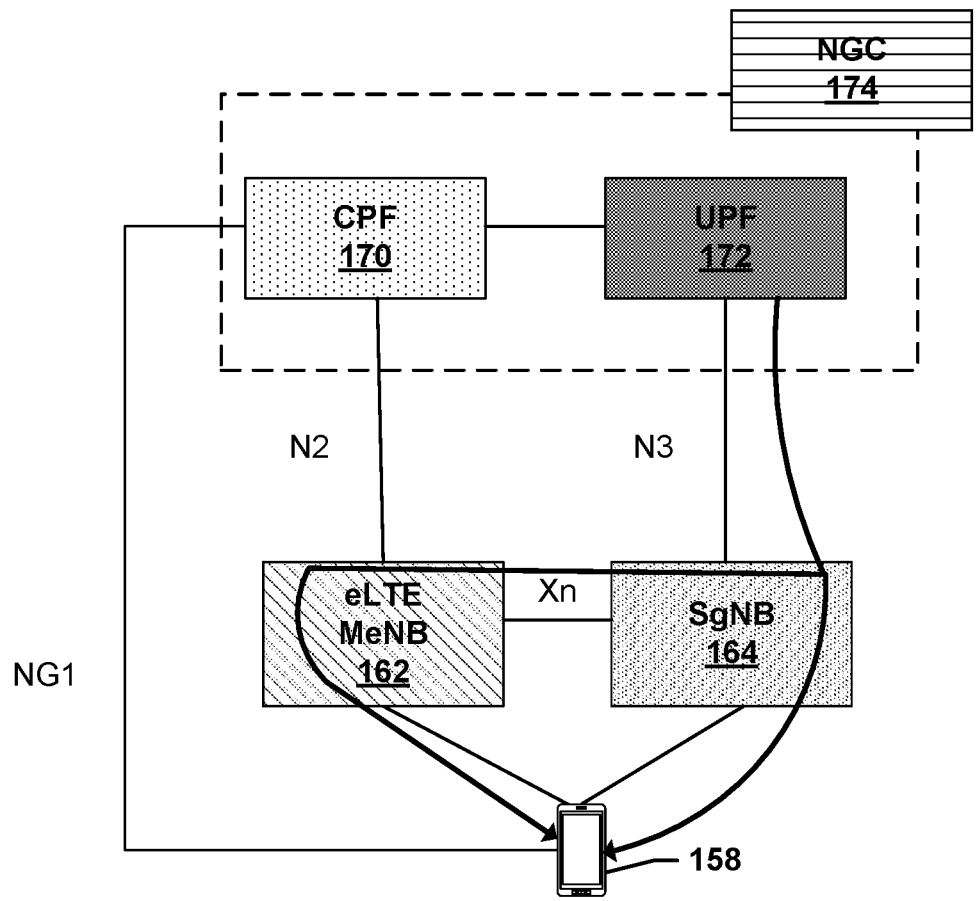

As shown in FIG. 1F, example LTE/NR 5GC connection deployment options may include Option 5—a standalone LTE RAN including a base station, such as an eNB 156 (e.g., a base station 110*a-d*) connected to a next generation core (NGC) 174 (e.g., core network 140). In such deployments, the eNB 156 may be an enhanced LTE (eLTE) base station configured to connect a 5GC, such as NGC 174. The EPC 154 may include a control plane function (CPF) server 170 and a user plane function (UPF) server 172. The wireless device 158 (e.g., wireless device 120*a-e*) may connect to the eNB 156 and send/receive user plane data to the eNB 156 which may send/receive the user plane data to the NGC 174 via the N3 interface with the UPF server 172. As shown in FIG. 1G, example LTE/NR 5GC connection deployment options may include Option 7—MCG split bearer with a non-standalone LTE anchor connected to the NGC 174. In such a deployment, a master base station, such as a MeNB 162 (e.g., base station 110*a*-110*d*) may control the SgNB 164 (e.g., 110*a*-110*d*). In such deployments, the MeNB 162 may be an eLTE base station configured to connect a 5GC, such as NGC 174. The MeNB 162 may connect to the SgNB 164 and may provide the connection for the SgNB 164 to the NGC 174. The wireless device 158 may connect to the MeNB 162 or the SgNB 164 and send/receive user plane data to the MeNB 162 or the SgNB 164. The SgNB 164 may send/receive user plane data from the MeNB 162 via the Xn interface. The MeNB 162 may send/receive user plane data to the NGC 174 via the N3 interface with the UPF server 172. As shown in FIG. 1H, example LTE/NR 5GC connection deployment options may include Option 7a—SCG bearer with a non-standalone LTE anchor connected to the NGC 174. In such a deployment, the SgNB 164 may connect to the NGC 174. The wireless device 158 may connect to the SgNB 164 and send/receive user plane data to the SgNB 164, which may send/receive the user plane data to the NGC 174 via the N3 interface with the UPF server 172. As shown in FIG. 1I, example LTE/NR 5GC connection deployment options may include Option 7x—SCG split bearer with a non-standalone LTE anchor connected to the NGC 174. The SgNB 164 may connect to the MeNB 162 and may provide the connection for the MeNB 162 to the NGC 174. The wireless device 158 may connect to the MeNB 162 or the SgNB 164 and send/receive user plane data to the MeNB 162 or the SgNB 164. The MeNB 162 may send/receive user plane data from the SgNB 164 via the Xn interface. The SgNB 164 may send/receive user plane data to the NGC 174 via the N3 interface with the UPF server 172.

The deployment options illustrated in FIGS. 1B-1I are merely examples of deployment options and other deployment options exist. The example deployment options illustrated in FIGS. 1B-1I, as well as other deployment options, may be used with the various embodiments.

Figure 2:
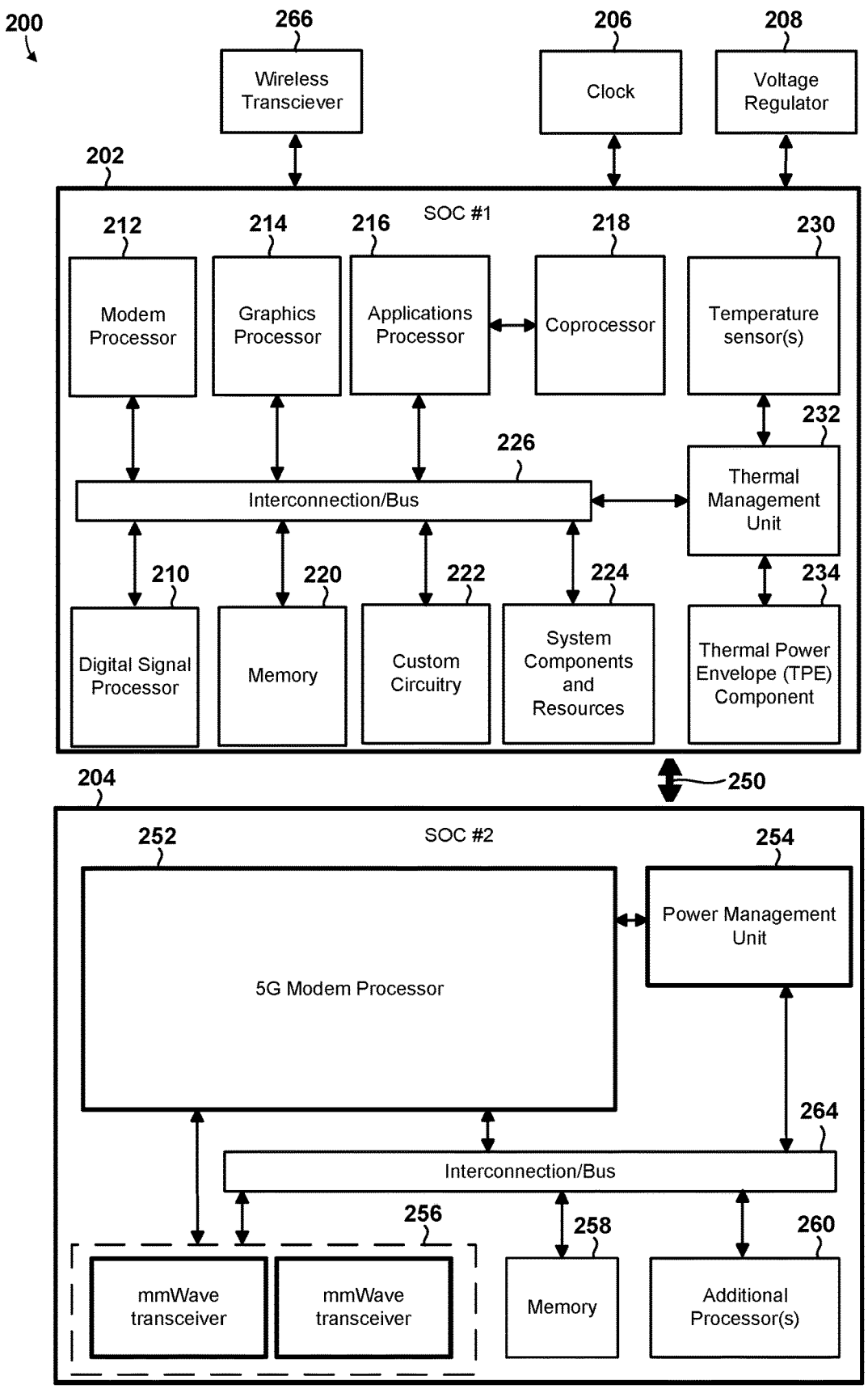
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example wireless device 200 (which may be a SIP in some embodiments) includes a two SOCs 202, 204 coupled to a clock 206, a voltage regulator 208, and a wireless transceiver 266 configured to send and receive wireless communications via an antenna (not shown) to/from network wireless devices, such as a base station 110*a*. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/ bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/ cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, and one or more wireless transceivers 266. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
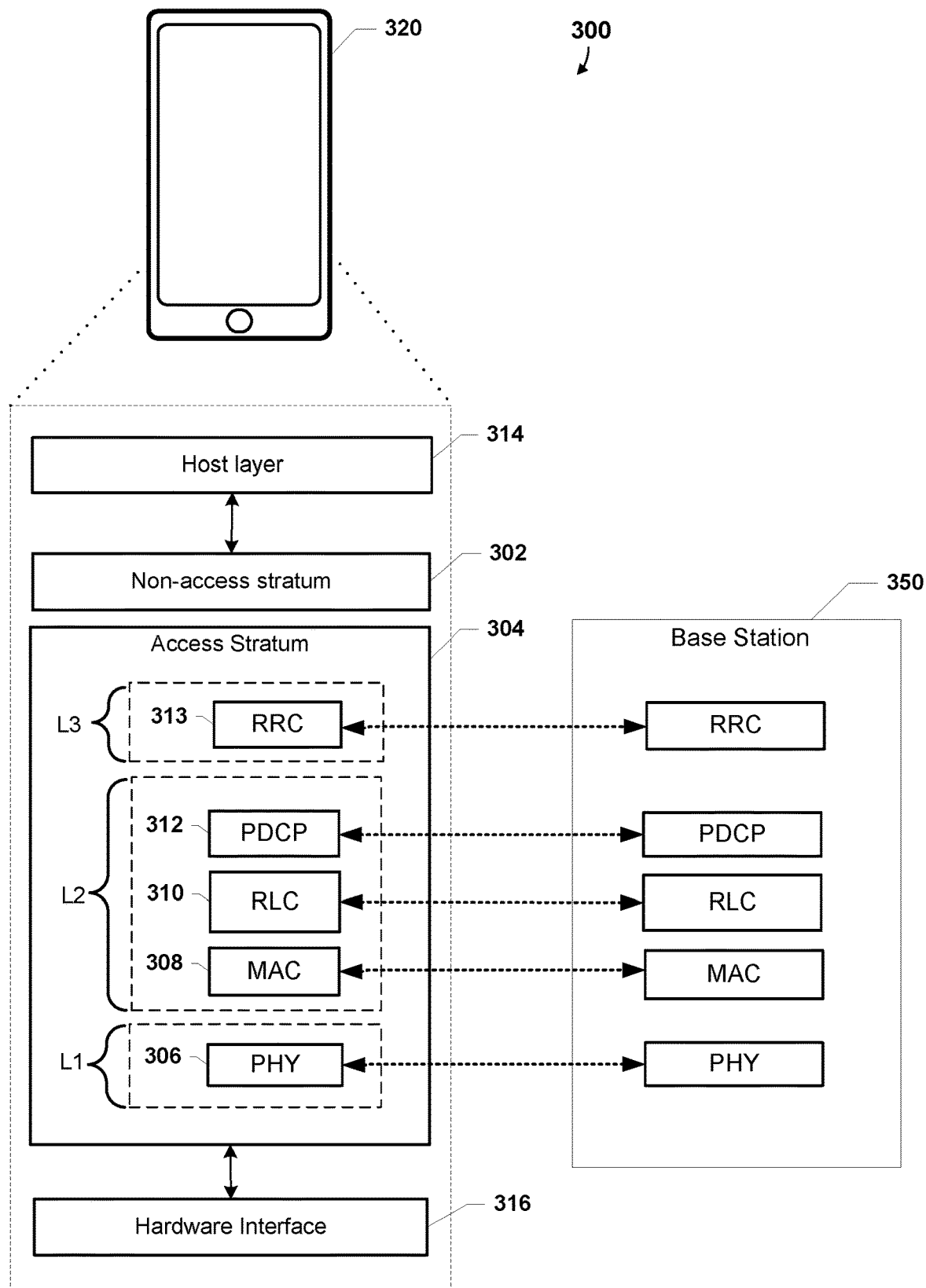
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a-110d, 156, 162, 164, 176, 182) and a wireless device (also referred to as a UE or UE computing device) 320 (e.g., the wireless device 120a-120e, 158, 200).

With reference to FIGS. 1A-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a Radio link control (RLC) sublayer 310, and a Packet data convergence protocol (PDCP) 312 sublayer, each of which form logical connections terminating at the base station 350.

In the control plane, Layer 3 (L3) of the AS 304 may include a Radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a Packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more Radio frequency (RF) transceivers).

Figure 4:
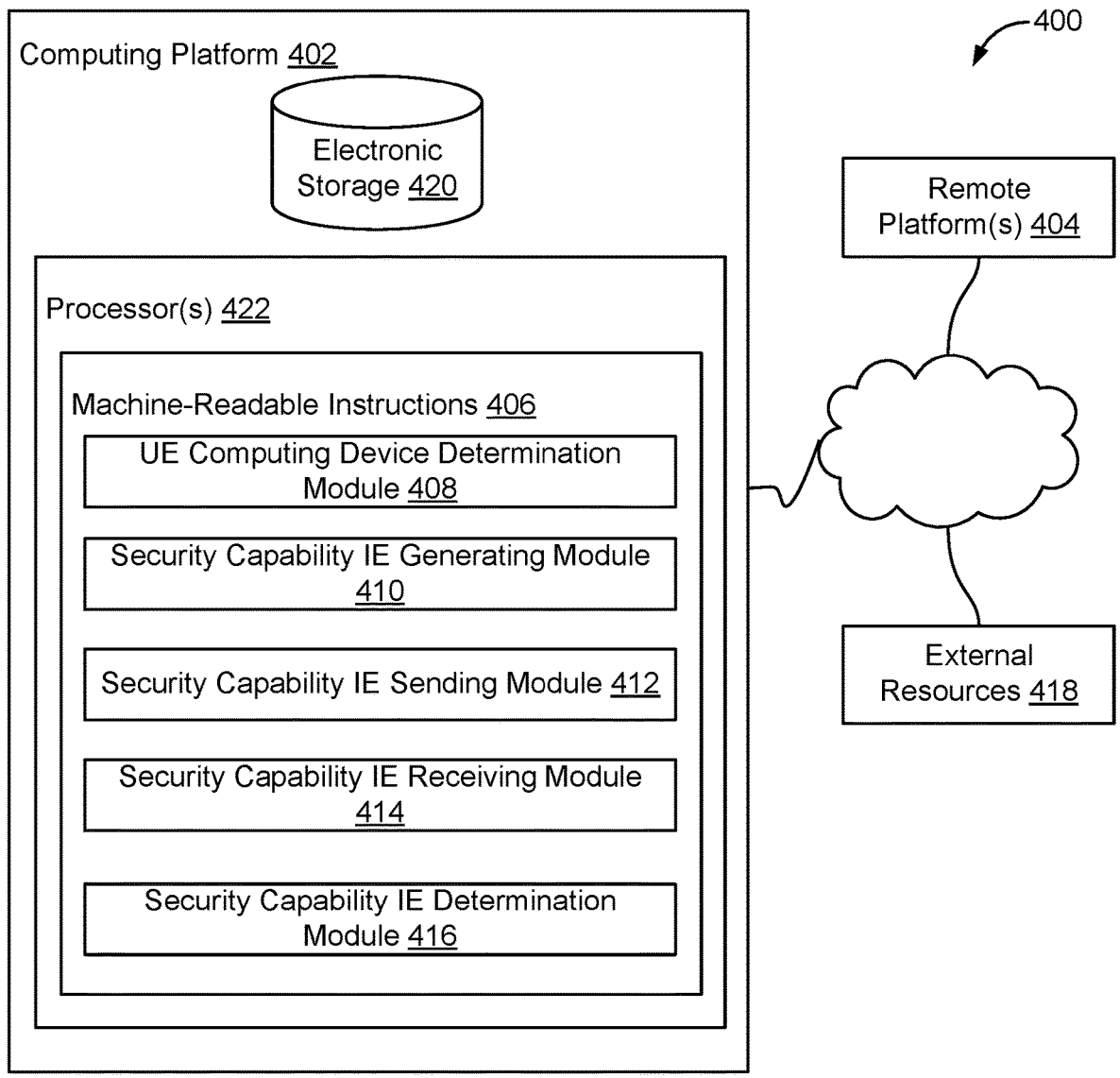
FIG. 4 is a component block diagram illustrating a system configured performed by a processor a wireless device for supporting user plane integrity protection (UP IP) for communications with a radio access network (RAN) in accordance with various embodiments.

FIG. 4 is a component block diagram illustrating a system 400 for supporting user plane integrity protection (UP IP) for communications with a RAN in accordance with various embodiments. In some embodiments, system 400 may include one or more computing platforms 402 and/or one or more remote platforms 404. With reference to FIGS. 1A-4, computing platform(s) 402 may include a base station (e.g., the base station 110a-110e, 156, 162, 164, 176, 182, 350) and/or a wireless device (e.g., the wireless device 120a-120e, 158, 200, 320). Remote platform(s) 404 may include a base station (e.g., the base station 110a-110e, 156, 162, 164, 176, 182, 350) and/or a wireless device (e.g., the wireless device 120a-120e, 158, 200, 320).

Computing platform(s) 402 may include processors 422 configured by machine-readable instructions 406. Machine-readable instructions 406 may include one or more instruction modules. The instruction modules may include computer program modules. The instruction modules may include one or more of user equipment (UE) computing device determination module 408, security capability IE generating module 410, security capability IE sending module 412, security capability IE receiving module 414, security capability IE determination module 416, and/or other instruction modules.

UE computing device determination module 408 may be configured to determine whether the wireless device supports UP IP for eUTRA connections established between the wireless device and a RAN. In various embodiments, determining whether the wireless device supports UP IP for eUTRA may include checking a capability setting of the wireless device. User equipment computing device determination module 408 may be configured to determine whether the wireless device supports UP IP for NR connections established between the wireless device and a RAN. In various embodiments, determining whether the wireless device supports UP IP for NR connections may include checking a capability setting of the wireless device.

Security capability IE generating module 410 may be configured to generate one or more security capability IEs including a one or more UP IP support indications. The UP IP support indications may be bit settings in the security capability IEs. For example, a security capability IE may be a 5G UE security capability IE or may be a S1 UE security capability IE. The UP IP support indication may indicate whether the wireless device supports UP IP for eUTRA connections established between the wireless device and the RAN and/or whether the wireless device supports UP IP for NR connections established between the wireless device and the RAN. The UP IP support indication may indicate UP IP support with several integrity algorithms. The first UP IP support indication may be a setting of one of the Evolved Packet System (EPS) Encryption Algorithm (EEA) or EPS Integrity Algorithm (EIA) bits in the 5G UE security capability IE or the S1 UE security capability IE. In various embodiments, more than one security capability IE may be generated by the security capability IE generating module 410. For example, a first security capability IE and a second security capability IE may be generated. As a specific example, the first security capability IE may be a S1 UE security capability IE and the second security capability IE may be a 5G UE security capability IE, or vice versa. In various embodiments, the security capability IE generating module 410 may be configured to generate a security capability IE including two UP IP support indications. For example, each UP IP support indication may be a separate bit setting in the security capability IE. One bit setting may indicate whether the wireless device supports UP IP for eUTRA and the other bit setting may indicate whether the wireless device supports UP IP for NR connections established between the wireless device and the RAN.

Security capability IE sending module 412 may be configured to send the security capability IEs to base stations of the RAN. As examples, the base station may be an eNB or a ng-eNB. In some embodiments the security capability IEs may be sent to the RAN via other nodes.

Security capability IE receiving module 414 may be configured to receive the security capability Is.

Security capability IE determination module 416 may be configured to determine whether the security capability IE indicates that the wireless device supports UP IP for eUTRA connections established with the wireless device based at least in part on the UP IP support indication. Security capability IE determination module 416 may be configured to determine whether the security capability IE indicates that the wireless device supports UP IP for NR connections established with the wireless device.

Figure 5:
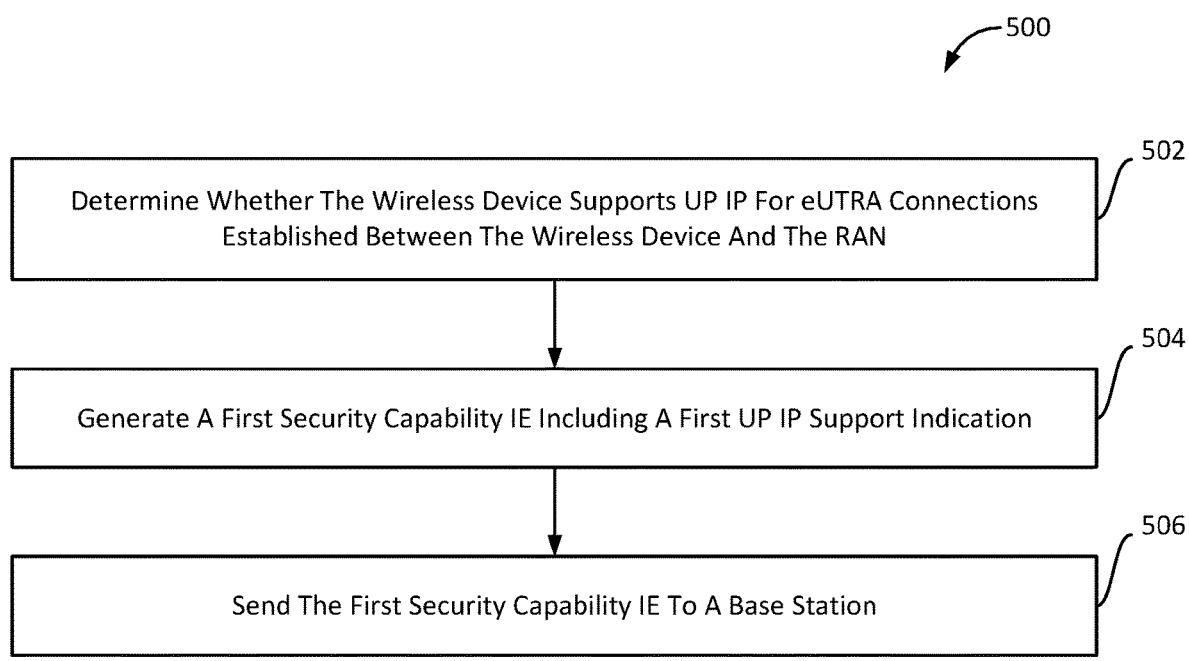
FIG. 5 is a process flow diagram illustrating a method for supporting user plane integrity protection for communications with a RAN in accordance with various embodiments.

FIG. 5 shows a process flow diagram of an example method 500 of supporting UP IP for communications with a RAN according to various embodiments. With reference to FIGS. 1A-5, the method 500 may be implemented by a processor (e.g., 210, 212, 214, 216, 218, 252, 260, 422) of a wireless device (e.g., the wireless device 120a-120e, 158, 200, 320, 402).

In block 502, the processor may perform operations including determining whether the wireless device supports UP IP for eUTRA connections established between the wireless device and a RAN. In various embodiments, determining whether the wireless device supports UP IP for eUTRA may include checking a capability setting of the wireless device.

In block 504, the processor may perform operations including generating a first security capability IE including a first UP IP support indication. The first UP IP support indication may indicate whether the wireless device supports UP IP for eUTRA connections established between the wireless device and the RAN. In some embodiments, the first security capability IE may be a 4G S1 UE security capability IE. In some embodiments, the first security capability IE may be a 5G UE security capability IE. In various embodiments, the first UP IP support indication may be a bit setting in the first security capability IE. For example, the first UP IP support indication may be a setting of one of the EEA or EIA bits in a 4G S1 UE security capability IE or a 5G UE security capability IE. In some embodiments, the setting of the bit in the 4G S1 UE security capability IE, such as the setting of one of the EEA or EIA bits in a 4G S1 UE security capability IE, may indicate both that the wireless device supports UP IP for eUTRA connections established between the wireless device and a RAN and UP IP for NR connections established between the wireless device and a RAN. In various embodiments, the first UP IP support indication may indicate UP IP support with one or more (e.g., several) integrity algorithms.

In block 506, the processor may perform operations including sending the first security capability IE to a base station. In some embodiments, the base station may be a base station of the RAN. In some embodiments, the base station may be a base station outside the RAN, which may be configured to forward the first security capability IE to a network device of the RAN, such as a base station of the RAN, an MME server of the RAN, etc. For example, the first security capability IE may be sent as part of a wireless device registration request sent to the RAN.

Figure 6:
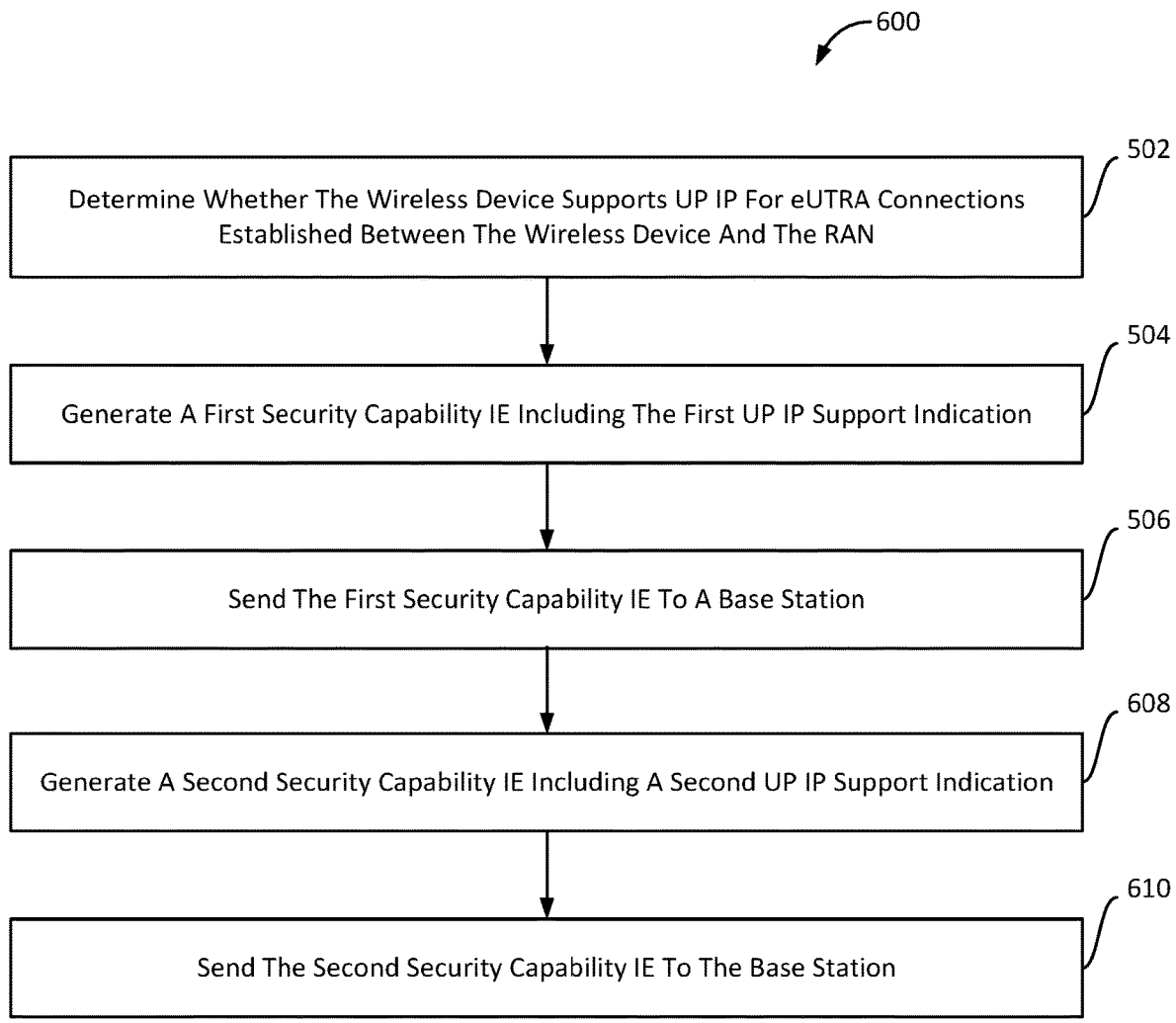
FIG. 6 is a process flow diagram illustrating a method for supporting user plane integrity protection for communications with a RAN in accordance with various embodiments.

FIG. 6 shows a process flow diagram of an example method 600 of supporting UP IP for communications with a RAN according to various embodiments. With reference to FIGS. 1A-6, the method 600 may be implemented by a processor (e.g., 210, 212, 214, 216, 218, 252, 260, 422) of a wireless device (e.g., the wireless device 120a-120e, 158, 200, 320, 402).

In blocks 502, 504, and 506, the processor may perform operations of like numbered blocks of method 500 described with reference to FIG. 5.

In block 608, the processor may perform operations including generating a second security capability IE including a second UP IP support indication. In networks including both 4G and 5G RAN elements, two security capability IEs may be provided to the RAN, such as one security capability IE for 4G systems and one security capability IE for 5G systems. Each security capability IE may separately indicate whether the wireless device supports UP IP for eUTRA connections and/or UP IP for NR connections. For example, the first security capability IE may be a 4G S1 UE security capability IE and the second security capability IE may be a 5G UE security capability IE. In various embodiments, the second UP IP support indication may be a bit setting in the second security capability IE. For example, the second UP IP support indication may be a setting of one of the EEA or EIA bits in a 4G S1 UE security capability IE or a 5G UE security capability IE depending on the type of the second security capability IE. In various embodiments, the second UP IP support indication may indicate UP IP support with one or more (e.g., several) integrity algorithms.

In block 610, the processor may perform operations including sending the second security capability IE to the base station. In some embodiments, the base station may be a base station of the RAN. In some embodiments, the base station may be a base station outside the RAN, which may be configured to forward the second security capability IE to a network device of the RAN, such as a base station of the RAN, an MME server of the RAN, etc. For example, the second security capability IE may be sent as part of a wireless device registration request sent to the RAN.

While FIG. 6 illustrates a method 600 for sending two separate security capability IEs, such as one security capability IE for 4G systems and another security capability IE for 5G systems, in other networks only one security capability IE may be generated and sent as the network may be configured to share the security capability IE and/or the indication of the support for UP IP by the wireless device between 4G and 5G systems. In such networks sharing wireless device support for UP IP indications across 4G and 5G systems, re-registration of the wireless device when crossing between 4G and 5G coverage may not be required.

Figure 7:
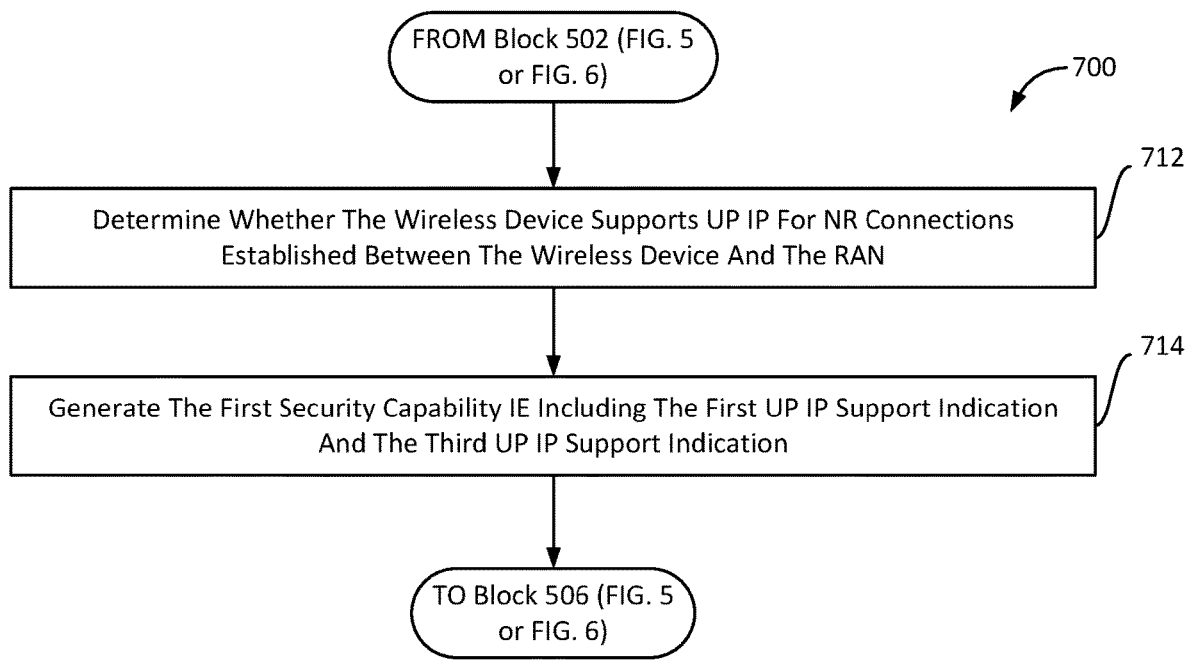
FIG. 7 is a process flow diagram illustrating a method for supporting user plane integrity protection for communications with a RAN in accordance with various embodiments.

FIG. 7 shows a process flow diagram of an example method 700 of supporting UP IP for communications with a RAN according to various embodiments. With reference to FIGS. 1A-7, the method 700 may be implemented by a processor (e.g., 210, 212, 214, 216, 218, 252, 260, 422) of a wireless device (e.g., the wireless device 120a-120e, 158, 200, 320, 402). In various embodiments, the operations of method 700 may be implemented in conjunction with the operations of methods 500 (FIG. 5) and/or 600 (FIG. 6). For example, the operations of method 700 may be performed as part of generating the first security capability IE upon determining whether the wireless device supports UP IP for eUTRA connections established between the wireless device and a RAN in block 502.

In block 712, the processor may perform operations including determining whether the wireless device supports UP IP for NR connections established between the wireless device and a RAN. In various embodiments, determining whether the wireless device supports UP IP for NR connections may include checking a capability setting of the wireless device.

In block 714, the processor may perform operations including generating the first security capability IE including the first UP IP support indication and a third UP IP support indication. The third UP IP support indication may indicate whether the wireless device supports UP IP for NR connections established between the wireless device and the RAN. In some embodiments, the first security capability IE may be a 4G S1 UE security capability IE. In various embodiments, the first UP IP support indication may be a bit setting in the first security capability IE and the third UP IP support indication may be another bit setting in the first security capability IE. For example, the first UP IP support indication may be a setting of one of the EEA or EIA bits in a 4G S1 UE security capability IE and the third UP IP support indication may be a setting of another one of the EEA or EIA bits in the 4G S1 UE security capability IE.

In response to generating the first security capability IE, the processor may perform operations of block 506 as described with reference to FIGS. 5 and 6 to send the first security capability IE.

Figure 8:
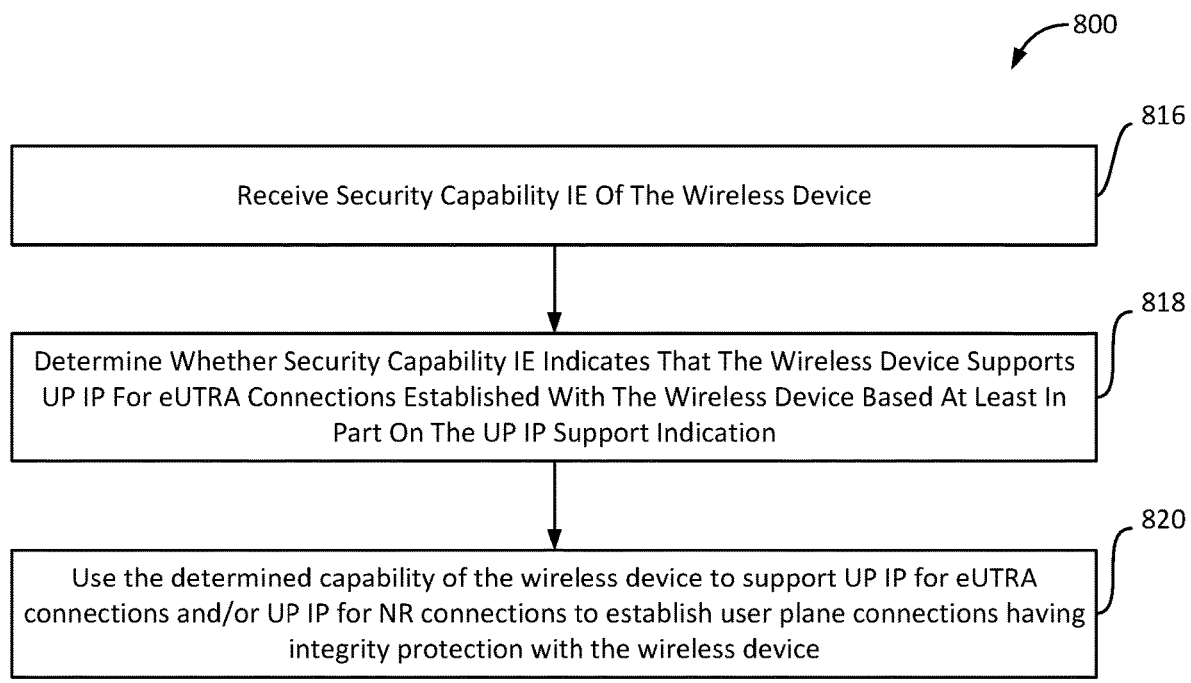
FIG. 8 is a process flow diagram illustrating a method for supporting user plane integrity protection for communications with a RAN in accordance with various embodiments.

FIG. 8 shows a process flow diagram of an example method 800 of supporting UP IP for communications with a RAN according to various embodiments. With reference to FIGS. 1A-8, the method 800 may be implemented by a processor of a network computing device (e.g., the base station 110a-110e, 156, 162, 164, 176, 182, 350, 402, network controller 130, and/or other network entities). In various embodiments, the operations of method 800 may be implemented in conjunction with the operations of methods 500 (FIG. 5), 600 (FIG. 6), and/or 700 (FIG. 7).

In block 816, the processor may perform operations including receiving a security capability IE of a wireless device (such as the wireless device 120a-120e, 200, 320). The security capability IE may be received as part of a wireless device registration and/or authentication procedures. The security capability IE may include a UP IP support indication. In some embodiments, the security capability IE may be a 4G S1 UE security capability IE. In some embodiments, the security capability IE may be a 5G UE security capability IE. In various embodiments, a UP IP support indication may indicate UP IP support with one or more (e.g., several) integrity algorithms. In various embodiments, the UP IP support indication may be a bit setting in the security capability IE. For example, the UP IP support indication may be a setting of one of the EEA or EIA bits in a 4G S1 UE security capability IE or a 5G UE security capability IE. In some embodiments, the security capability IE may be received directly from a wireless device, such as by a base station of the RAN. In some embodiments, the security capability ID may be received from the wireless device via forwarding from another network computing device, such as forwarded from a base station, forwarded from an MME server, etc.

In block 818, the processor may perform operations including determining whether the security capability IE indicates that the wireless device supports UP IP for eUTRA connections established with the wireless device based at least in part on the UP IP support indication. In various embodiments, the bit setting of the UP IP support indication in the security capability IE may indicate whether or not the wireless device supports UP IP for eUTRA connections established with the wireless device. For example, the setting of one of the EEA or EIA bits in a 4G S1 UE security capability IE or a 5G UE security capability IE to the value "1" may indicate that the wireless device does support UP IP for eUTRA. In some embodiments, the setting of the bit in the 4G S1 UE security capability IE, such as the setting of one of the EEA or EIA bits in a 4G S1 UE security capability IE, may indicate both that the wireless device supports UP IP for eUTRA connections established between the wireless device and a RAN and UP IP for NR connections established between the wireless device and a RAN. In various embodiments, the UP IP support indication may be a bit setting in the security capability IE.

In block 820, the network computing device may use the determined capability of the wireless device to support UP IP for eUTRA connections and/or UP IP for NR connections to establish user plane connections having integrity protection with the wireless device.

Figure 9:
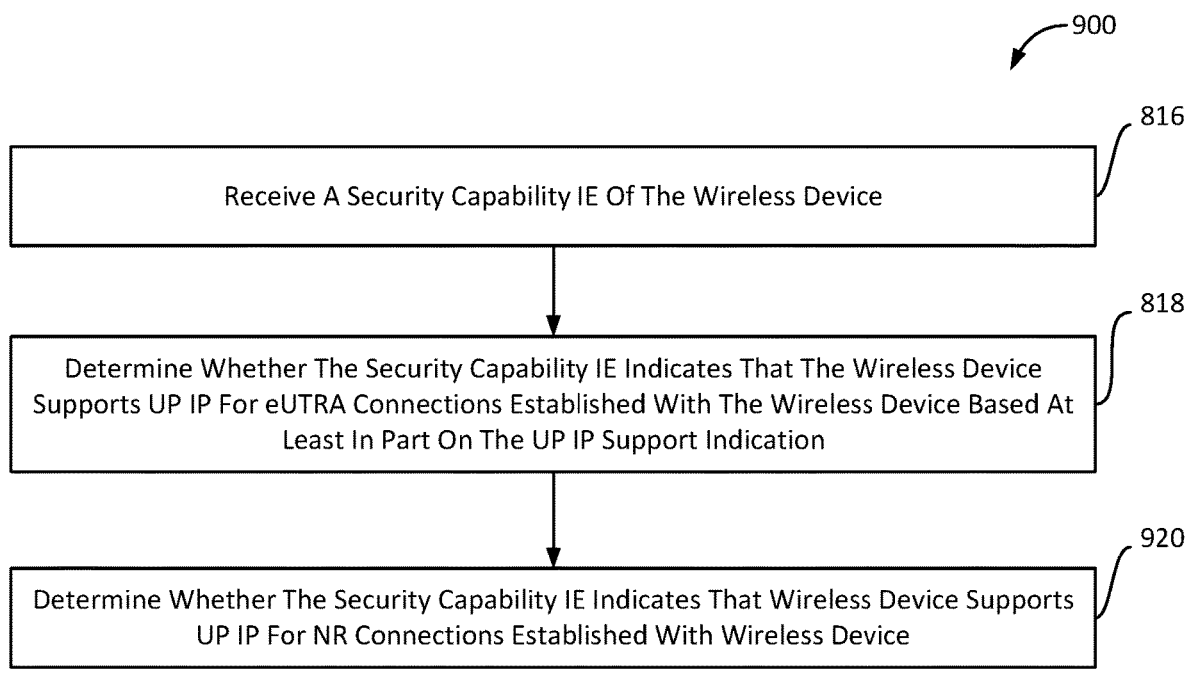
FIG. 9 is a process flow diagram illustrating a method for supporting user plane integrity protection for communications with a RAN in accordance with various embodiments.

FIG. 9 shows a process flow diagram of an example method 900 of supporting UP IP for communications with a RAN according to various embodiments. With reference to FIGS. 1A-9, the method 900 may be implemented by a processor of a network computing device (e.g., the base station 110a-110e, 156, 162, 164, 176, 182, 350, 402, network controller 130, and/or other network entities). In various embodiments, the operations of method 900 may be implemented in conjunction with the operations of methods 500 (FIG. 5), 600 (FIG. 6), and/or 700 (FIG. 7).

In blocks 816 and 818, the processor may perform operations of like numbered blocks of method 800 described with reference to FIG. 8.

In block 920, the processor may perform operations including determining whether the security capability IE indicates that the wireless device supports UP IP for NR connections established with the wireless device. In some embodiments, the UP IP support indication may have dual meaning indicating both that the wireless device supports UP IP for eUTRA and supports UP IP for NR. In some embodiment, the security capability IE may include more than one UP IP support indication. For example, one UP IP support indication, such as one bit setting, may indicate that the wireless device supports UP IP for eUTRA connections, and another UP IP support indication, such as another bit setting, may indicate that the wireless device supports UP IP for NR connections.

Figure 10:
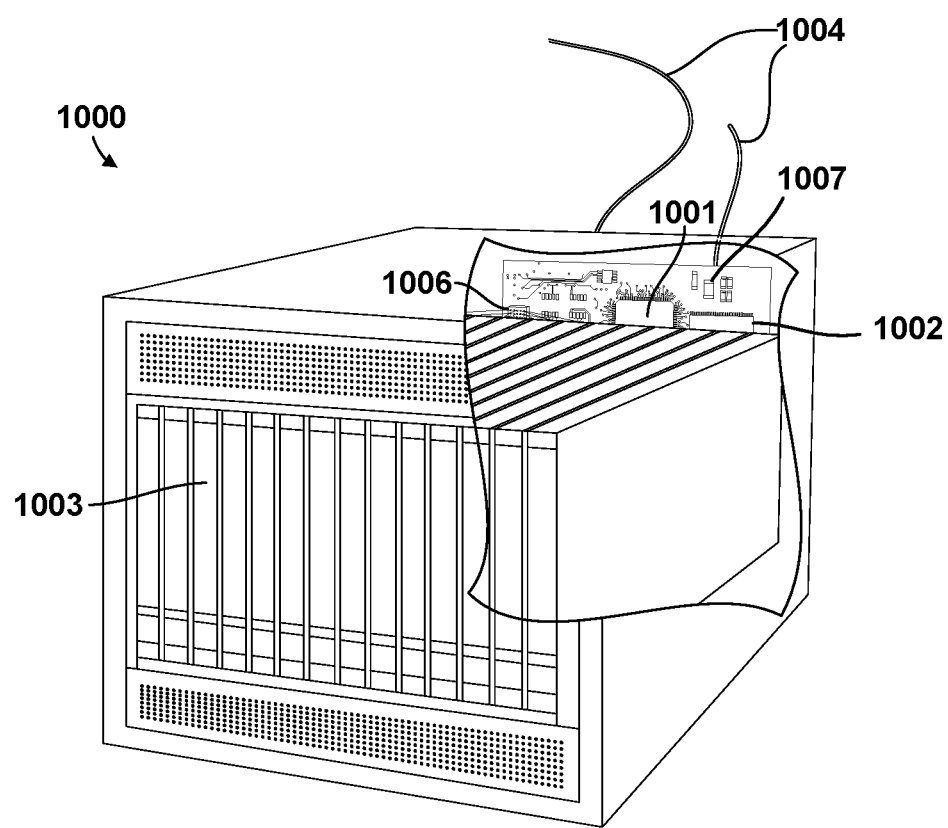
FIG. 10 is a component block diagram of a network computing device suitable for use with various embodiments.

Various embodiments may be implemented on a variety of wireless network devices, an example of which is illustrated in FIG. 10 in the form of a wireless network computing device 1000 functioning as a network element of a communication network, such as a base station (e.g., the base station 110a-110e, 156, 162, 164, 176, 182, 350, 402). Such network computing devices may include at least the components illustrated in FIG. 10. With reference to FIGS. 1A-10, the network computing device 1000 may typically include a processor 1001 coupled to volatile memory 1002 and a large capacity nonvolatile memory, such as a disk drive 1003. The network computing device 1000 may also include a peripheral memory Access device such as a floppy disc drive, compact disc (CD) or digital video disc (DVD) drive 1006 coupled to the processor 1001. The network computing device 1000 may also include network Access ports 1004 (or interfaces) coupled to the processor 1001 for establishing data connections with a network, such as the Internet and/or a local area network coupled to other system computers and servers. The network computing device 1000 may include one or more antennas 1007 for sending and receiving electromagnetic radiation that may be connected to a wireless communication link. The network computing device 1000 may include additional Access ports, such as USB, Firewire, Thunderbolt, and the like for coupling to peripherals, external memory, or other devices.

Figure 11:
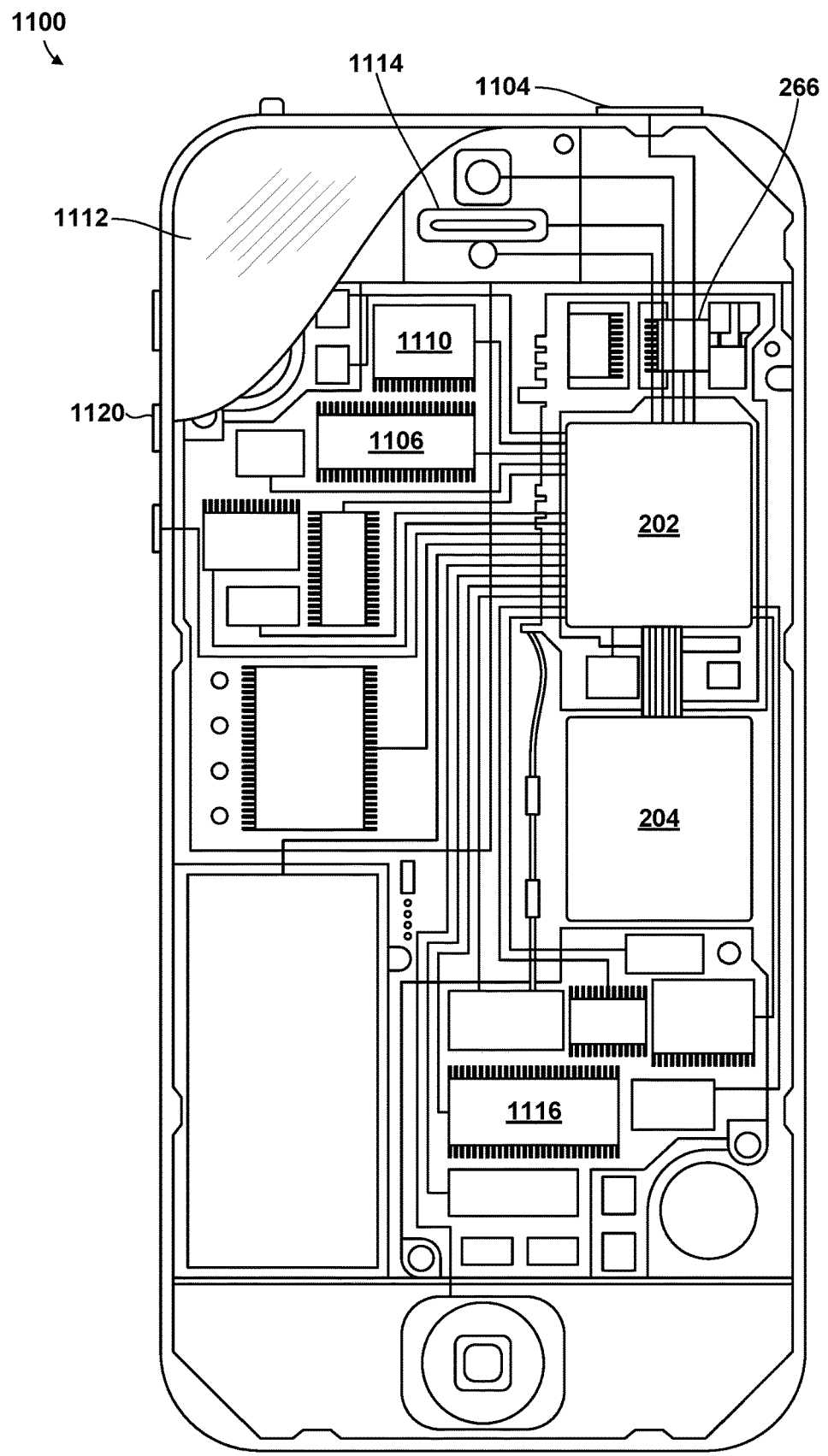
FIG. 11 is a component block diagram of a wireless device suitable for use with various embodiments.

Various embodiments may be implemented on a variety of computing devices, such as wireless devices (e.g., the wireless device 120a-120e, 158, 200, 320, 402), an example of which is illustrated in FIG. 11 in the form of a smartphone 1100. With reference to FIGS. 1A-11, the smartphone 1100 may include a first SOC 202 (e.g., a SOC-CPU) coupled to a second SOC 204 (e.g., a 5G capable SOC). The first and second SOCs 202, 204 may be coupled to internal memory 1106, 1116, a display 1112, and to a speaker 1114. Additionally, the smartphone 1100 may include an antenna 1104 for sending and receiving electromagnetic radiation that may be connected to a wireless data link and/or cellular telephone transceiver 266 coupled to one or more processors in the first and/or second SOCs 202, 204. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1108 and CODEC 1110 may include a digital signal processor (DSP) circuit (not shown separately).

The processors of the wireless network computing device 1000 and the smart phone 1100 may be any programmable microprocessor, microcomputer or multiple processor chip or chips that can be configured by software instructions (applications) to perform a variety of functions, including the functions of the various embodiments described below. In some Mobile devices, multiple processors may be provided, such as one processor within an SOC 204 dedicated to wireless communication functions and one processor within an SOC 202 dedicated to running other applications. Typically, software applications may be stored in the memory 1106, 1116 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and Mobile communication services and standards are available or contemplated in the future, all of which may implement and benefit from the various embodiments. Such services and standards include, e.g., third Generation partnership project (3GPP), long term evolution (LTE) systems, third Generation wireless Mobile communication technology (3G), fourth Generation wireless Mobile communication technology (4G), fifth Generation wireless Mobile communication technology (5G), global System for Mobile communications (GSM), Universal Mobile Telecommunications System (UMTS), 3GSM, general Packet Radio service (GPRS), code division multiple Access (CDMA) systems (e.g., cdmaOne, CDMA1020™), enhanced data rates for GSM evolution (EDGE), advanced Mobile phone System (AMPS), digital AMPS (IS-136/TDMA), evolution-data optimized (EV-DO), digital enhanced cordless Telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 700, 800, and/or 900 may be substituted for or combined with one or more operations of the methods 500, 600, 700, 800, and/or 900.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting user plane integrity protection (UP IP) for communications with a radio access network (RAN), comprising:
    checking, by a processor of a wireless device, a capability setting of the wireless device that is configured to indicate to the wireless device whether the wireless device supports UP IP for Evolved Universal Mobile Telecommunications System (UMTS) Terrestrial Radio Access (eUTRA) connections established between the wireless device and a RAN;

determining, by the processor of the wireless device, whether the wireless device supports UP IP for eUTRA connections established between the wireless device and the RAN based on the capability setting of the wireless device;

generating, by the processor, a first security capability information element (IE) of a fifth generation (5G) UE security capability including a first UP IP support indication, wherein the first UP IP support indication indicates to the RAN whether the wireless device supports UP IP for eUTRA connections established between the wireless device and the RAN and the first UP IP support indication comprises a setting of at least one bit of Evolved Packet System (EPS) Encryption Algorithm (EEA) bits that is different from at least one bit configured to indicate support of EEA or at least one bit of EPS Integrity Algorithm (EIA) bits that is different from at least one bit configured to indicate support of EIA wherein the first UP IP support indication indicates support of UP IP with one or more algorithms; and sending, by the processor, the first security capability IE to a base station.

2. The method of claim 1, further comprising:

generating, by the processor, a second security capability IE of an S1 user equipment (UE) security capability including a second UP IP support indication, wherein the second UP IP support indication indicates whether the wireless device supports UP IP for eUTRA connections established between the wireless device and the RAN or UP IP for new radio (NR) connections established between the wireless device and the RAN; and sending, by the processor, the second security capability IE to the base station.

3. The method of claim 2, wherein the second UP IP support indication is a bit setting in the second security capability IE.

4. The method of claim 2, further comprising:

determining, by the processor, whether the wireless device supports UP IP for new radio (NR) connections established between the wireless device and the RAN, wherein generating the second security capability IE of the S1 UE security capability including the second UP IP support indication comprises generating the second security capability IE including the second UP IP support indication and a third UP IP support indication, wherein the second UP IP support indication indicates whether the wireless device supports UP IP for eUTRA connections established between the wireless device and the RAN and the third UP IP support indication indicates whether the wireless device supports UP IP for NR connections established between the wireless device and the RAN.

5. The method of claim 4, wherein the second UP IP support indication is a first bit setting in the second security capability IE and the third UP IP support indication is a second bit setting in the second security capability IE.

6. The method of claim 4, wherein the second UP IP support indication and the third UP IP support indication are a bit setting in the second security capability IE.

7. The method of claim 1, wherein the RAN is connected to an Evolved Packet Core (EPC) network or a Next Generation Core (NGC) network.

8. The method of claim 7, wherein the RAN is a fourth generation (4G) RAN or a 5G RAN.

9. The method of claim 1, wherein the first UP IP support indication indicates support of UP IP with one or more algorithms.

10. A wireless device, comprising:

a processor configured with processor-executable instructions to:

check a capability setting of the wireless device that is configured to indicate to the wireless device whether the wireless device supports user plane integrity protection (UP IP) for Evolved Universal Mobile Telecommunications System (UMTS) Terrestrial Radio Access (eUTRA) connections established between the wireless device and a radio access network (RAN);

determine whether the wireless device supports UP IP for eUTRA connections established between the wireless device and the RAN based on the capability setting of the wireless device;

generate a first security capability information element (IE) of a fifth generation (5G) UE security capability including a first UP IP support indication, wherein the first UP IP support indication indicates to the RAN whether the wireless device supports UP IP for eUTRA connections established between the wireless device and the RAN and the first UP IP support indication comprises a setting of at least one bit of Evolved Packet System (EPS) Encryption Algorithm (EEA) bits that is different from at least one bit configured to indicate support of EEA or at least one bit of EPS Integrity Algorithm (EIA) bits that is different from at least one bit configured to indicate support of EIA wherein the first UP IP support indication indicates support of UP IP with one or more algorithms; and send the first security capability IE to a base station.

11. The wireless device of claim 10, wherein the processor is further configured with processor-executable instructions to:

generate a second security capability IE of an S1 user equipment (UE) security capability including a second UP IP support indication, wherein the second UP IP support indication indicates whether the wireless device supports UP IP for eUTRA connections established between the wireless device and the RAN or UP IP for new radio (NR) connections established between the wireless device and the RAN; and send the second security capability IE to the base station.

12. The wireless device of claim 11, wherein the processor is further configured with processor-executable instructions to generate the second UP IP support indication as a bit setting in the second security capability IE.

13. The wireless device of claim 11, wherein the processor is further configured with processor-executable instructions to:

determine whether the wireless device supports UP IP for new radio (NR) connections established between the wireless device and the RAN, and generate the second security capability IE of the S1 UE security capability including the second UP IP support indication by generating the second security capability IE including the second UP IP support indication and a third UP IP support indication, wherein the second UP IP support indication indicates whether the wireless device supports UP IP for eUTRA connections established between the wireless device and the RAN and the third UP IP support indication indicates whether the wireless device supports UP IP for NR connections established between the wireless device and the RAN.

14. The wireless device of claim 13, wherein the processor is further configured with processor-executable instructions to generate the second UP IP support indication as a first bit setting in the second security capability IE and the third UP IP support indication as a second bit setting in the second security capability IE.

15. The wireless device of claim 13, wherein the processor is further configured with processor-executable instructions to generate the second UP IP support indication and the third UP IP support indication as a bit setting in the second security capability IE.

16. The wireless device of claim 10, wherein the processor is further configured with processor-executable instructions to generate the first UP IP support indication to indicate support of UP IP with one or more algorithms.

17. A wireless device, comprising:
means for checking a capability setting of the wireless device that is configured to indicate to the wireless device whether the wireless device supports user plane integrity protection (UP IP) for Evolved Universal Mobile Telecommunications System (UMTS) Terrestrial Radio Access (eUTRA) connections established between the wireless device and a radio access network (RAN);
means for determining whether the wireless device supports UP IP for eUTRA connections established between the wireless device and the RAN based on the capability setting of the wireless device;
means for generating a first security capability information element (IE) of a fifth generation (5G) UE security capability including a first UP IP support indication, wherein the first UP IP support indication indicates to the RAN whether the wireless device supports UP IP for eUTRA connections established between the wireless device and the RAN and the first UP IP support indication comprises a setting of at least one bit of Evolved Packet System (EPS) Encryption Algorithm (EEA) bits that is different from at least one bit configured to indicate support of EEA or at least one bit of EPS Integrity Algorithm (EIA) bits that is different from at least one bit configured to indicate support of EIA wherein the first UP IP support indication indicates support of UP IP with one or more algorithms; and
means for sending the first security capability IE to a base station.

18. The wireless device of claim 17, further comprising:
means for generating a second security capability IE of an S1 user equipment (UE) security capability including a second UP IP support indication, wherein the second UP IP support indication indicates whether the wireless device supports UP IP for eUTRA connections established between the wireless device and the RAN or UP IP for new radio (NR) connections established between the wireless device and the RAN; and
means for sending the second security capability IE to the base station.

19. The wireless device of claim 18, wherein the second UP IP support indication is a bit setting in the second security capability IE.

20. The wireless device of claim 18, further comprising:
means for determining whether the wireless device supports UP IP for new radio (NR) connections established between the wireless device and the RAN, and
means for generating the second security capability IE of the S1 UE security capability including the second UP IP support indication by generating the second security capability IE including the second UP IP support indication and a third UP IP support indication, wherein the second UP IP support indication indicates whether the wireless device supports UP IP for eUTRA connections established between the wireless device and the RAN and the third UP IP support indication indicates whether the wireless device supports UP IP for NR connections established between the wireless device and the RAN.

21. The wireless device of claim 20, wherein the second UP IP support indication is a first bit setting in the second security capability IE and the third UP IP support indication is a second bit setting in the second security capability IE.

22. The wireless device of claim 20, wherein the second UP IP support indication and the third UP IP support indication are a bit setting in the second security capability IE.

23. A non-transitory processor-readable storage medium having stored thereon processor-executable instructions to cause a processor of a wireless device to perform operations comprising:
checking a capability setting of the wireless device that is configured to indicate to the wireless device whether the wireless device supports user plane integrity protection (UPIP) for Evolved Universal Mobile Telecommunications System (UMTS) Terrestrial Radio Access (eUTRA) connections established between the wireless device and a radio access network (RAN);
determining whether the wireless device supports for eUTRA connections established between the wireless device and the RAN based on the capability setting of the wireless device;
generating a first security capability information element (IE) of a fifth generation (5G) UE security capability including a first UP IP support indication, wherein the first UP IP support indication indicates to the RAN whether the wireless device supports UP IP for eUTRA connections established between the wireless device and the RAN and the first UP IP support indication comprises a setting of at least one bit of Evolved Packet System (EPS) Encryption Algorithm (EEA) bits that is different from at least one bit configured to indicate support of EEA or at least one bit of EPS Integrity Algorithm (EIA) bits that is different from at least one bit configured to indicate support of EIA wherein the first UP IP support indication indicates support of UP IP with one or more algorithms; and
sending the first security capability IE to a base station.

24. The non-transitory processor-readable storage medium of claim 23, wherein the stored processor-executable instructions are configured to cause the processor to perform operations further comprising:
generating a second security capability IE of an S1 user equipment (UE) security capability including a second UP IP support indication, wherein the second UP IP support indication indicates whether the wireless device supports UP IP for eUTRA connections established between the wireless device and the RAN or UP IP for new radio (NR) connections established between the wireless device and the RAN; and
sending the second security capability IE to the base station.

25. The non-transitory processor-readable storage medium of claim 24, wherein the stored processor-executable instructions are configured to cause the processor to perform operations further comprising:

determining whether the wireless device supports UP IP for new radio (NR) connections established between the wireless device and the RAN, and generating the second security capability IE of the S1 UE security capability including the second UP IP support indication by generating the second security capability IE including the second UP IP support indication and a third UP IP support indication, wherein the second UP IP support indication indicates whether the wireless device supports UP IP for eUTRA connections established between the wireless device and the RAN and the third UP IP support indication indicates whether the wireless device supports UP IP for NR connections established between the wireless device and the RAN.

* * * * *